US012403687B1

(12) United States Patent
Quick

(10) Patent No.: US 12,403,687 B1
(45) Date of Patent: Sep. 2, 2025

(54) SYSTEM AND METHOD FOR LETTERPRESS PRINTING

(71) Applicant: Spellbinders Paper Arts Company, L.L.C., Phoenix, AZ (US)

(72) Inventor: Denzil R Quick, Peoria, AZ (US)

(73) Assignee: Spellbinders Paper Arts Company, L.L.C., Phoenix, AZ (US)

( * ) Notice: Subject to any disclaimer, the term of this patent is extended or adjusted under 35 U.S.C. 154(b) by 0 days.

(21) Appl. No.: 18/622,246

(22) Filed: Mar. 29, 2024

Related U.S. Application Data

(63) Continuation-in-part of application No. 29/888,314, filed on Mar. 29, 2023, now Pat. No. Des. 1,041,554.

(60) Provisional application No. 63/455,548, filed on Mar. 29, 2023.

(51) Int. Cl.
*B41F 5/02* (2006.01)
*B41F 33/00* (2006.01)
*B41M 1/02* (2006.01)

(52) U.S. Cl.
CPC ................ *B41F 5/02* (2013.01); *B41F 33/00* (2013.01); *B41M 1/02* (2013.01)

(58) Field of Classification Search
CPC .............. B41F 33/00; B41F 5/02; B41M 1/02
See application file for complete search history.

(56) References Cited

U.S. PATENT DOCUMENTS 2,277,405 A 3/1942 McKiernan
3,103,880 A 9/1963 Sandford
3,766,728 A * 10/1973 Nagy ................. G04C 17/0075 968/573
5,592,746 A 1/1997 Ternes
6,240,841 B1 6/2001 Newman
6,341,557 B1 * 1/2002 Hutchison ................ B41N 1/06 216/36
8,393,266 B2 3/2013 Rasmussen
9,597,909 B2 3/2017 Myska
9,731,531 B2 8/2017 Myska
9,776,443 B1 10/2017 Myska
9,849,705 B2 12/2017 Myska
9,925,812 B1 3/2018 Myska
9,931,875 B2 4/2018 Myska
D847,227 S 4/2019 Myska
10,518,567 B2 12/2019 Ericson
D885,482 S 5/2020 Myska
10,759,204 B1 9/2020 Garza
10,836,193 B2 11/2020 Garza
(Continued)

FOREIGN PATENT DOCUMENTS

CA 3081540 5/2019
GB 2558988 7/2018

*Primary Examiner* — David H Banh
(74) *Attorney, Agent, or Firm* — Michelle L. Gross, P.C.

(57) ABSTRACT

A system and method for having precise registration of a paper and a design and for substantially reducing the movement between a design and a paper when creating a letterpress comprising a set of letterpress plates with letterpress plate alignment features, a letterpress design, registration marks, ink, and paper that use a set of compatible alignment materials, recesses, posts, and springs that allow a first letterpress plate to register and secure a paper and a second letterpress plate to register and secure and design prior to compression, either manually or by a machine, and application of the ink onto the paper.

20 Claims, 23 Drawing Sheets

(56) References Cited

U.S. PATENT DOCUMENTS

| | | | | |
|---|---|---|---|---|
| 10,960,696 | B1 | 3/2021 | Garza | |
| 11,059,312 | B2 | 7/2021 | Ericson | |
| D945,526 | S | 3/2022 | Garza | |
| D948,359 | S | 4/2022 | Garza | |
| 11,518,184 | B2 | 12/2022 | Ericson | |
| 2007/0193458 | A1* | 8/2007 | Cheng | B44B 5/026 101/368 |
| 2008/0264284 | A1* | 10/2008 | Hutchison | B44B 5/026 101/394 |
| 2011/0290130 | A1* | 12/2011 | Whelan | B41F 3/36 101/158 |
| 2012/0186471 | A1* | 7/2012 | Hutchison | B41F 27/02 101/390 |
| 2013/0213251 | A1 | 8/2013 | Styles | |
| 2018/0022134 | A1 | 1/2018 | Myska | |
| 2018/0147870 | A1 | 5/2018 | Myska | |
| 2018/0297314 | A1* | 10/2018 | Hutchison | B30B 15/026 |
| 2019/0030937 | A1 | 1/2019 | Myska | |
| 2019/0061337 | A1* | 2/2019 | Domsch | B44B 5/026 |
| 2019/0304809 | A1* | 10/2019 | Raorane | H01L 25/0655 |
| 2019/0337014 | A1 | 11/2019 | Chatain et al. | |
| 2021/0011290 | A1 | 1/2021 | Maimone et al. | |
| 2021/0060991 | A1 | 3/2021 | Garza | |
| 2021/0260900 | A1 | 8/2021 | Ericson | |
| 2022/0040876 | A1* | 2/2022 | Talkington | B26D 7/2614 |

* cited by examiner

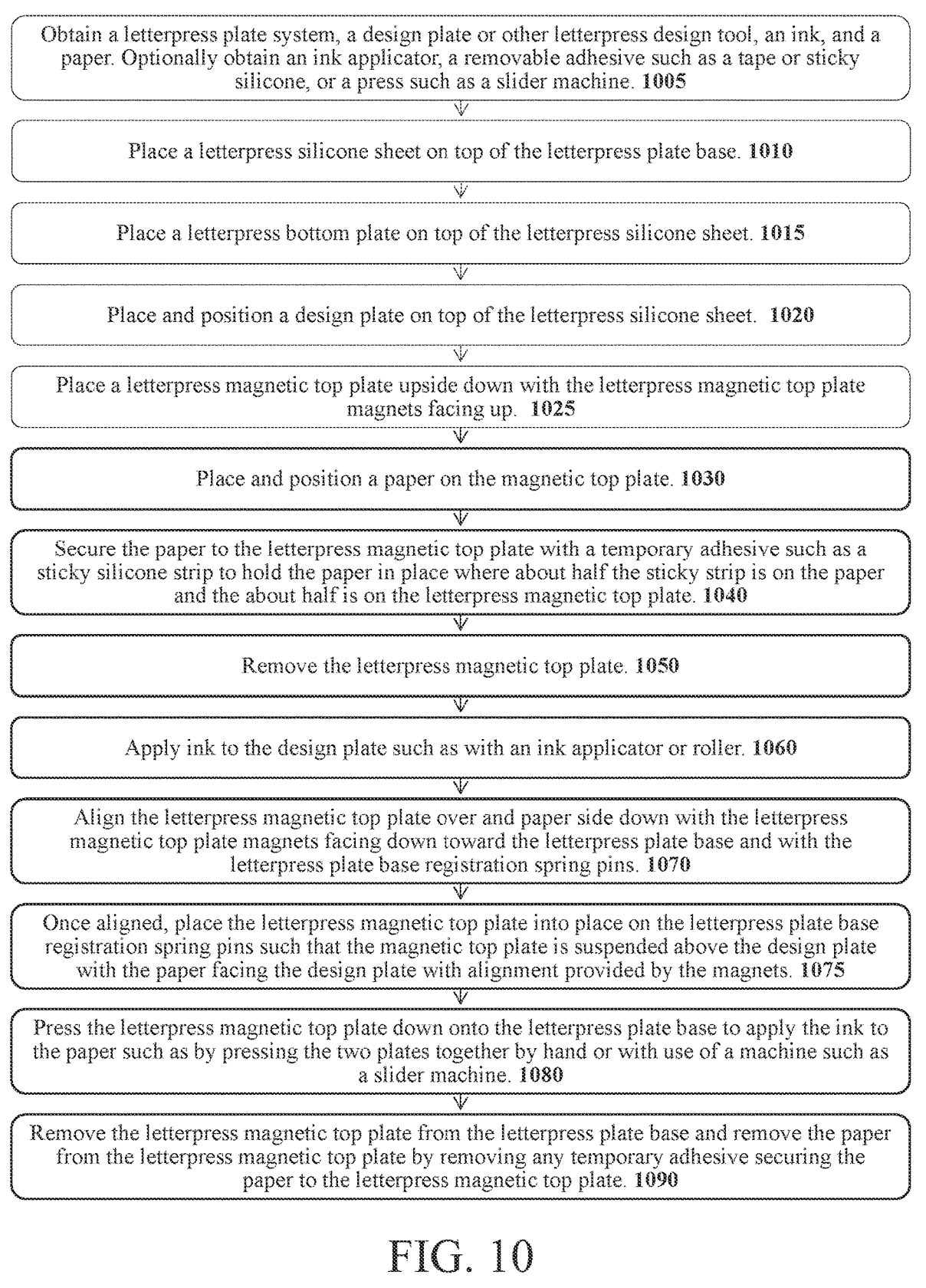

Obtain a letterpress plate system, a design plate or other letterpress design tool, an ink, and a paper. Optionally obtain an ink applicator, a removable adhesive such as a tape or sticky silicone, or a press such as a slider machine. 1005

↓

Place a letterpress silicone sheet on top of the letterpress plate base. 1010

↓

Place a letterpress bottom plate on top of the letterpress silicone sheet. 1015

↓

Place and position a design plate on top of the letterpress silicone sheet. 1020

↓

Place a letterpress magnetic top plate upside down with the letterpress magnetic top plate magnets facing up. 1025

↓

Place and position a paper on the magnetic top plate. 1030

↓

Secure the paper to the letterpress magnetic top plate with a temporary adhesive such as a sticky silicone strip to hold the paper in place where about half the sticky strip is on the paper and the about half is on the letterpress magnetic top plate. 1040

↓

Remove the letterpress magnetic top plate. 1050

↓

Apply ink to the design plate such as with an ink applicator or roller. 1060

↓

Align the letterpress magnetic top plate over and paper side down with the letterpress magnetic top plate magnets facing down toward the letterpress plate base and with the letterpress plate base registration spring pins. 1070

↓

Once aligned, place the letterpress magnetic top plate into place on the letterpress plate base registration spring pins such that the magnetic top plate is suspended above the design plate with the paper facing the design plate with alignment provided by the magnets. 1075

↓

Press the letterpress magnetic top plate down onto the letterpress plate base to apply the ink to the paper such as by pressing the two plates together by hand or with use of a machine such as a slider machine. 1080

↓

Remove the letterpress magnetic top plate from the letterpress plate base and remove the paper from the letterpress magnetic top plate by removing any temporary adhesive securing the paper to the letterpress magnetic top plate. 1090

FIG. 10

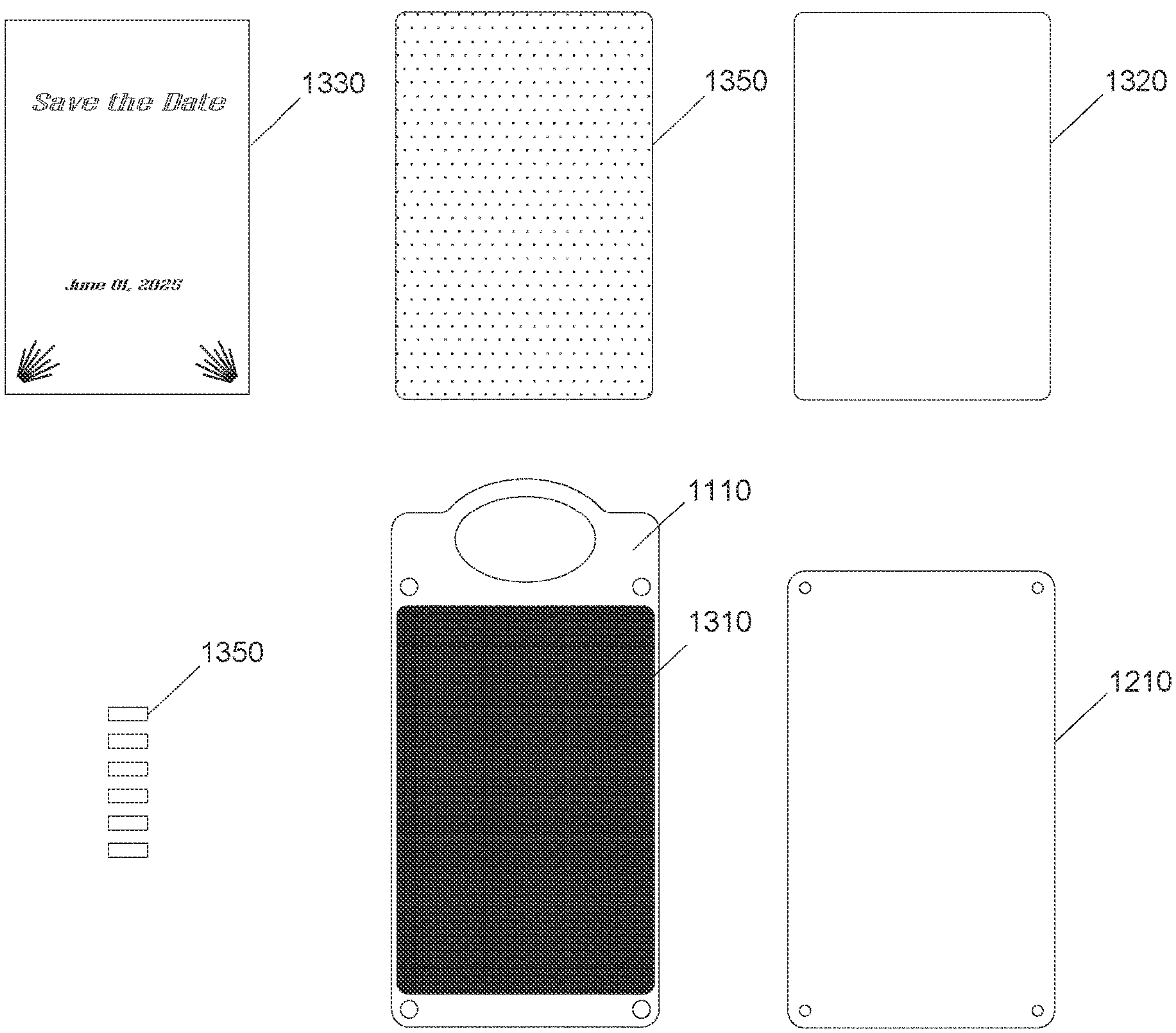
FIG. 14.1

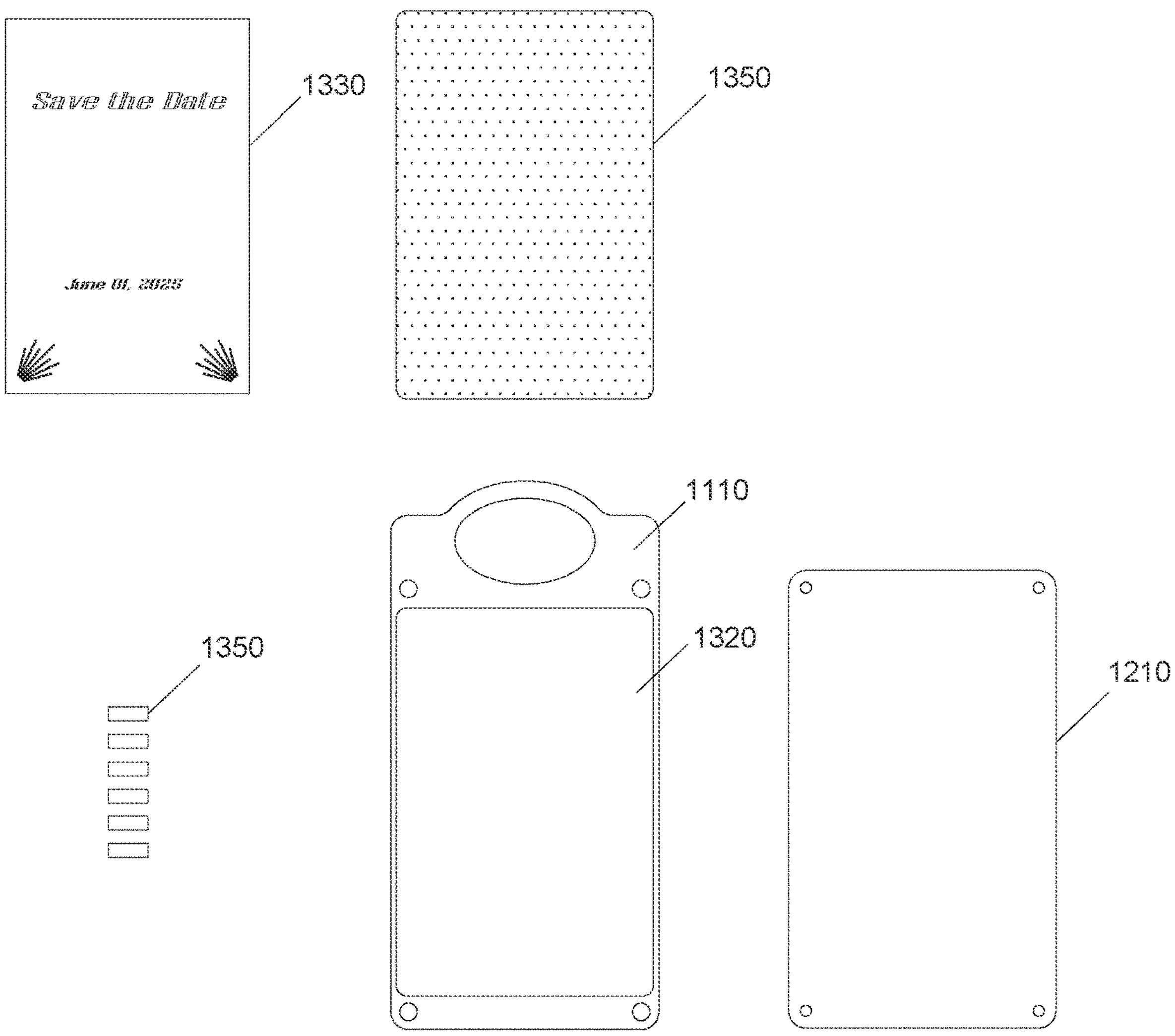
FIG. 14.2

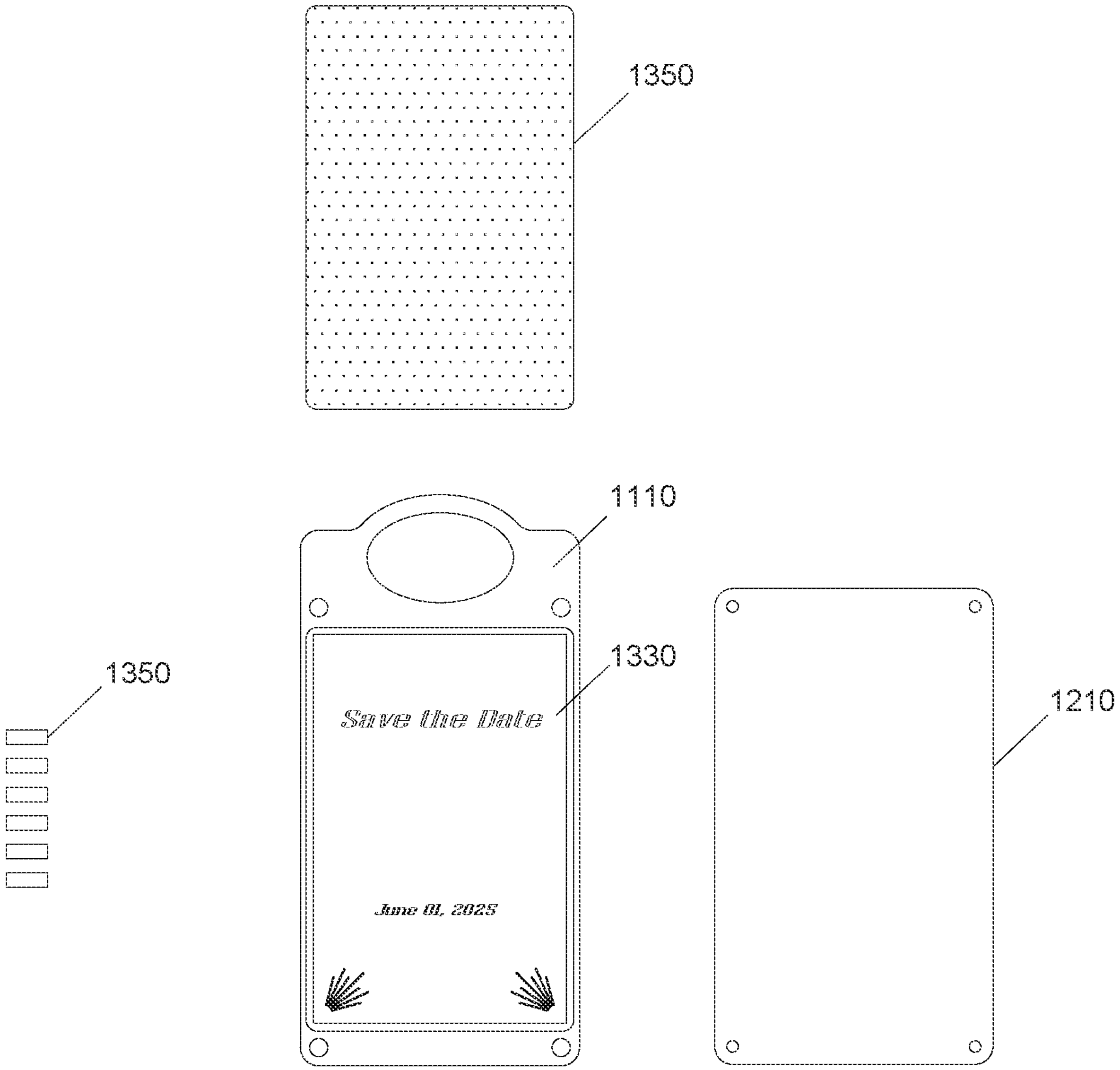
FIG. 14.3

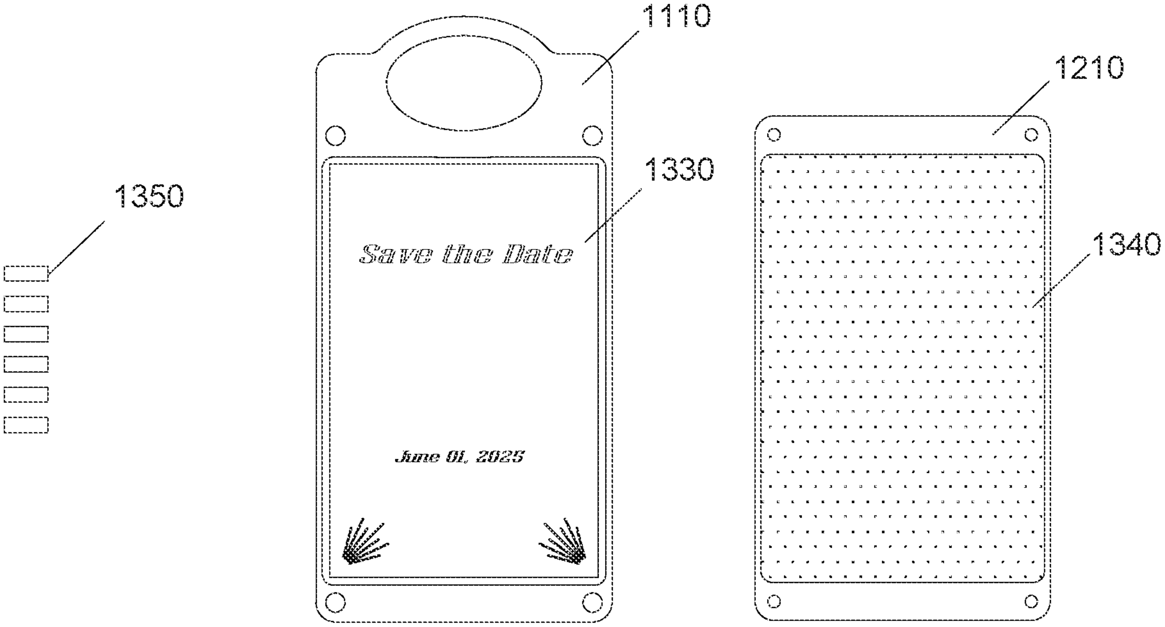
FIG. 14.4

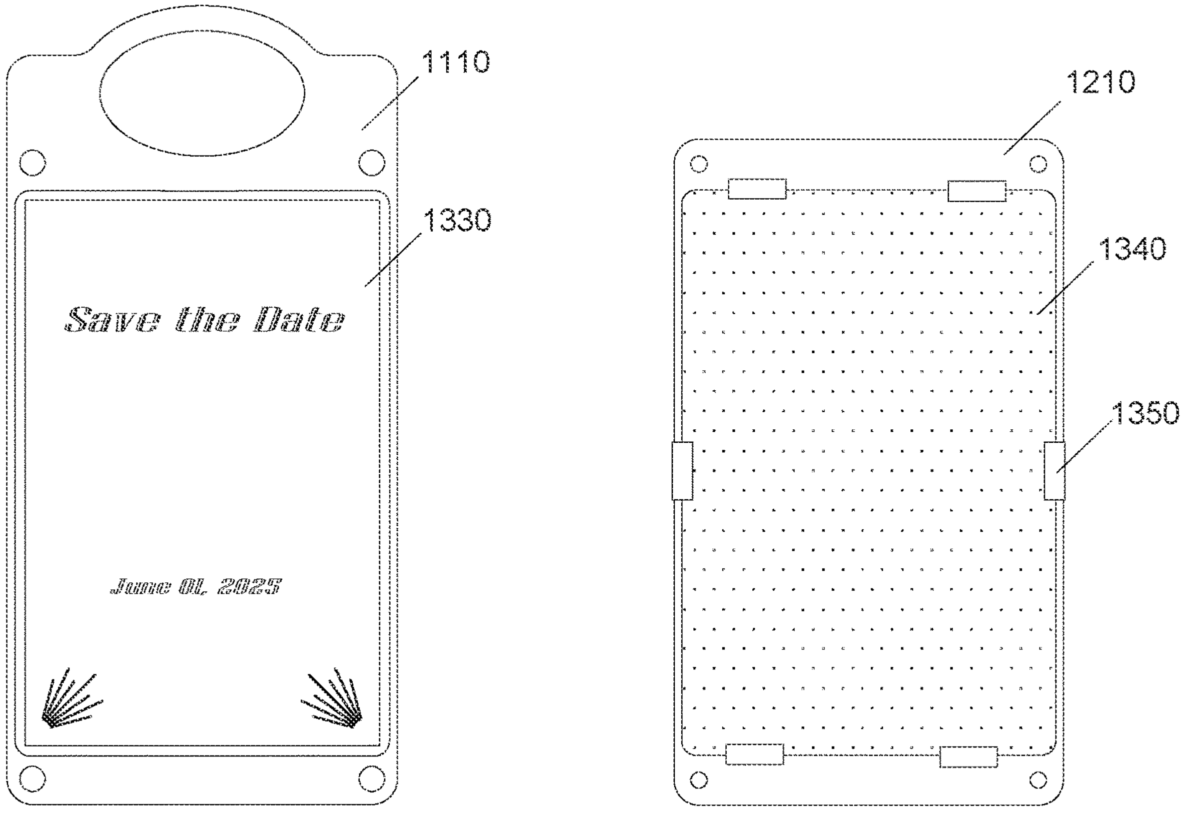
FIG. 14.5

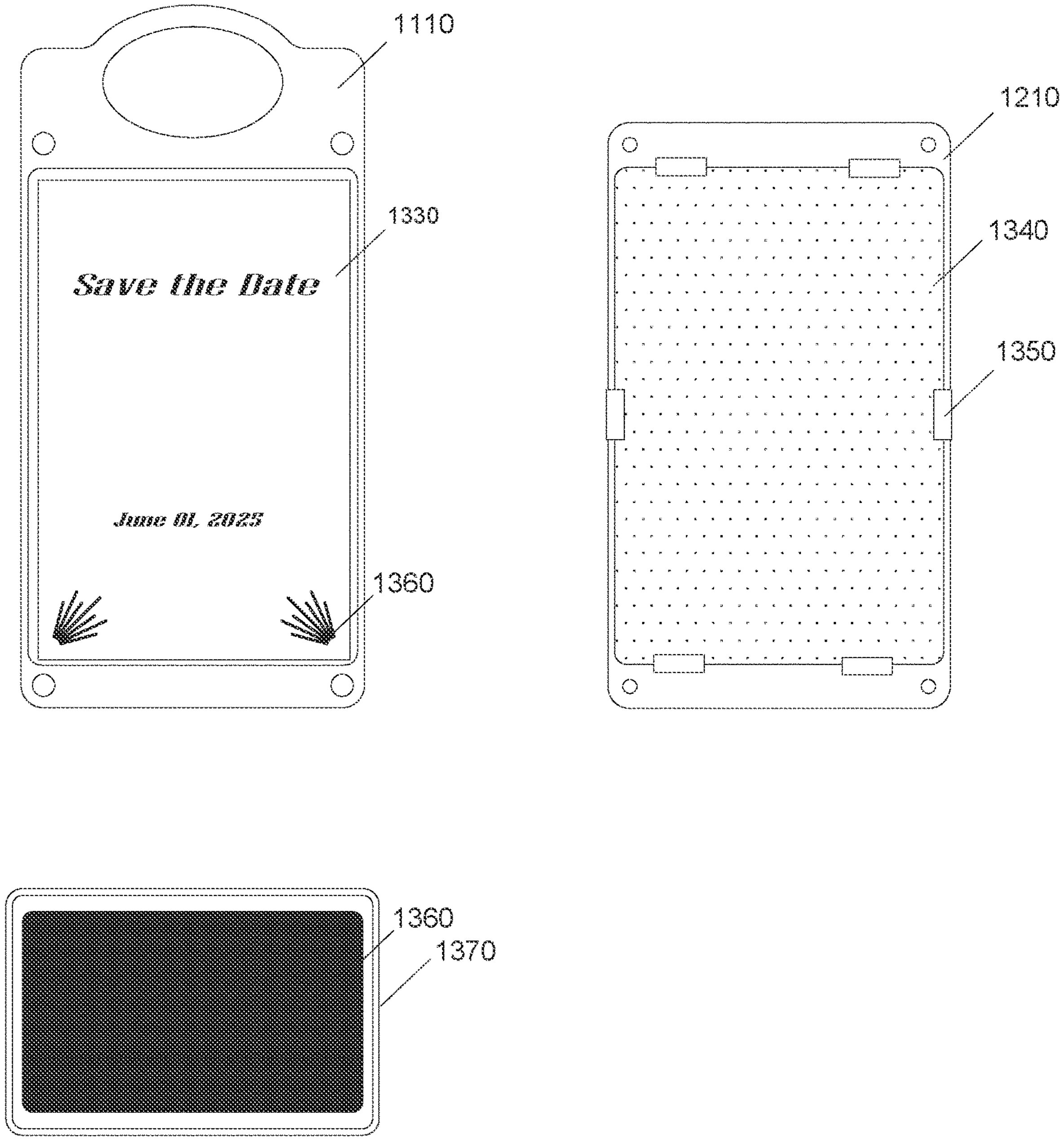
FIG. 14.6

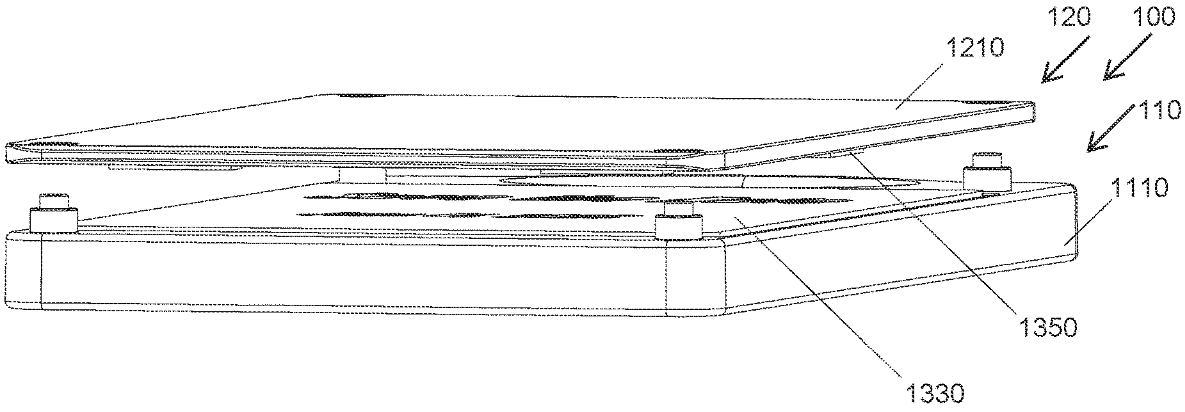
FIG. 14.7

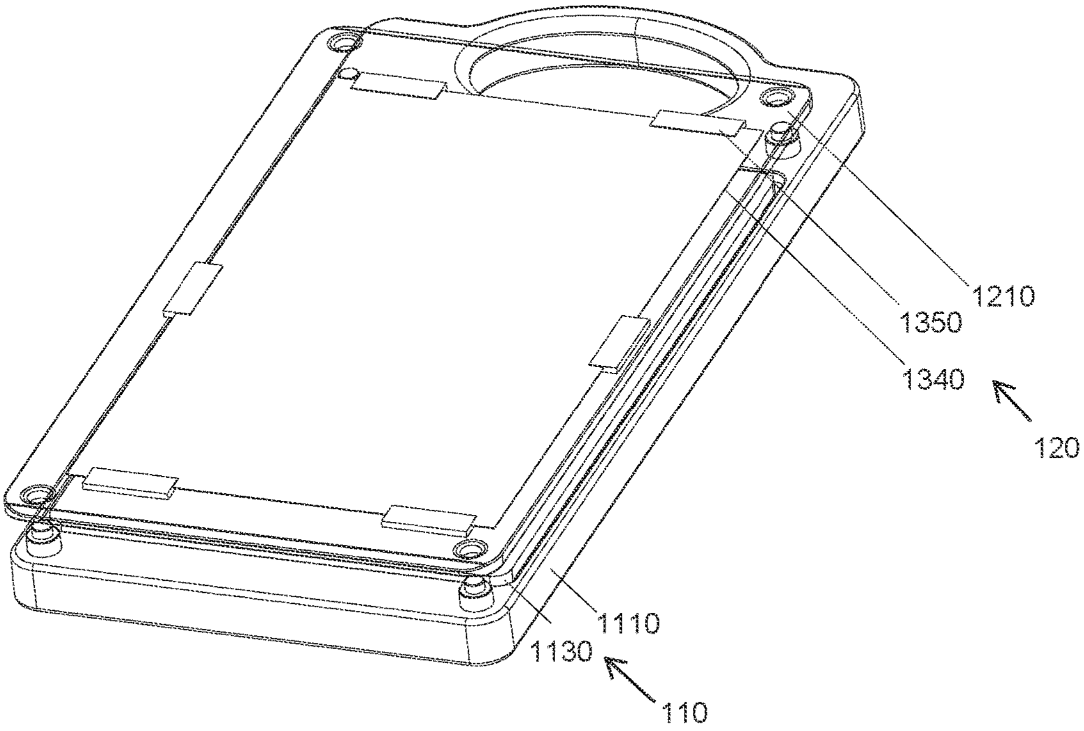
FIG. 14.8A
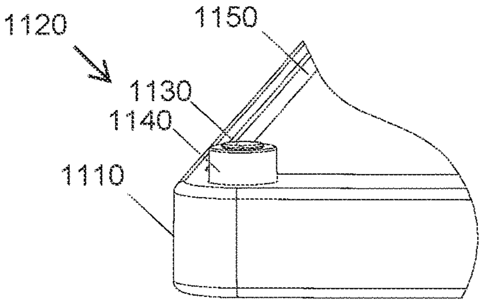
FIG. 14.8B
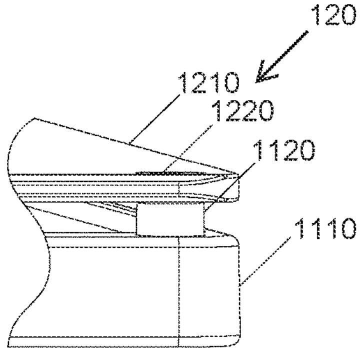
FIG. 14.8C

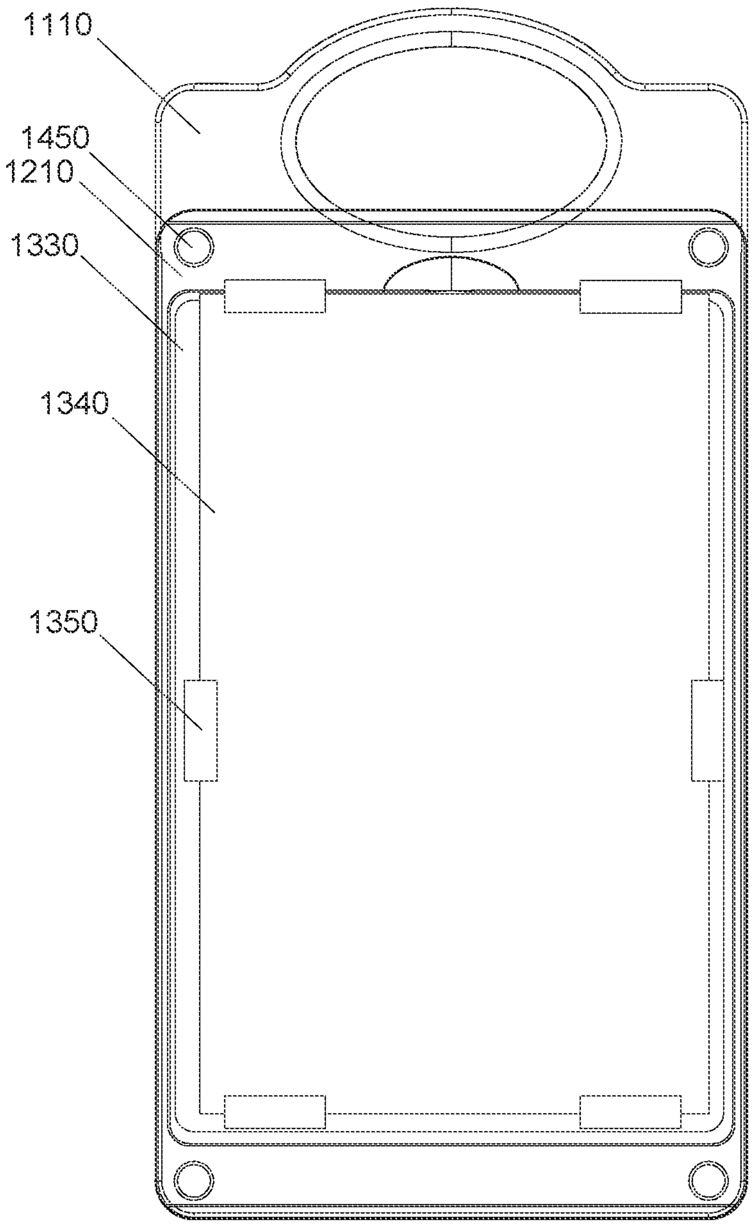
FIG. 14.9

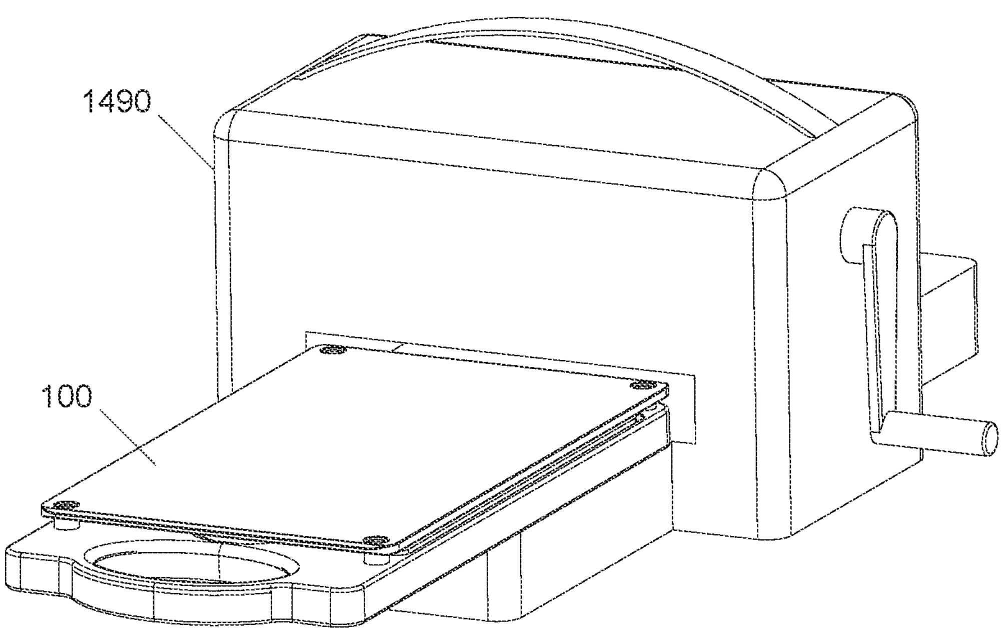
FIG. 14.10A
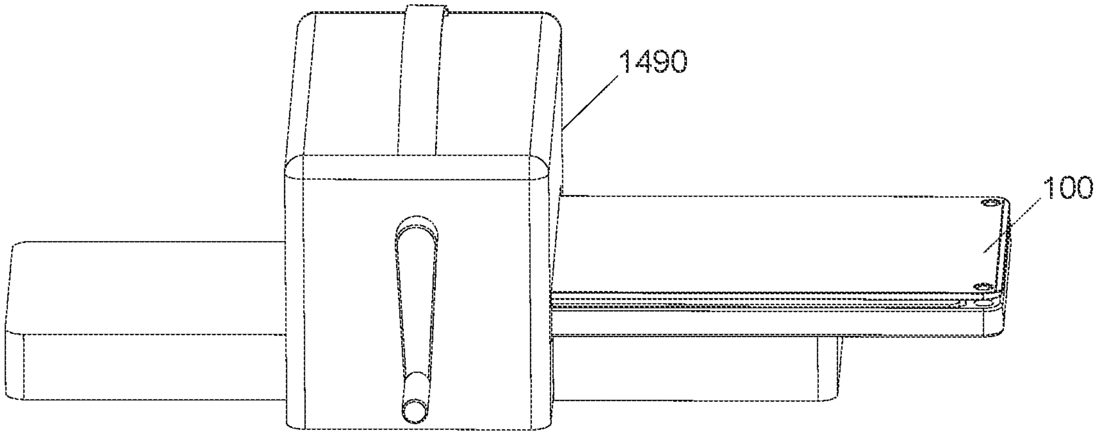
FIG. 14.10B

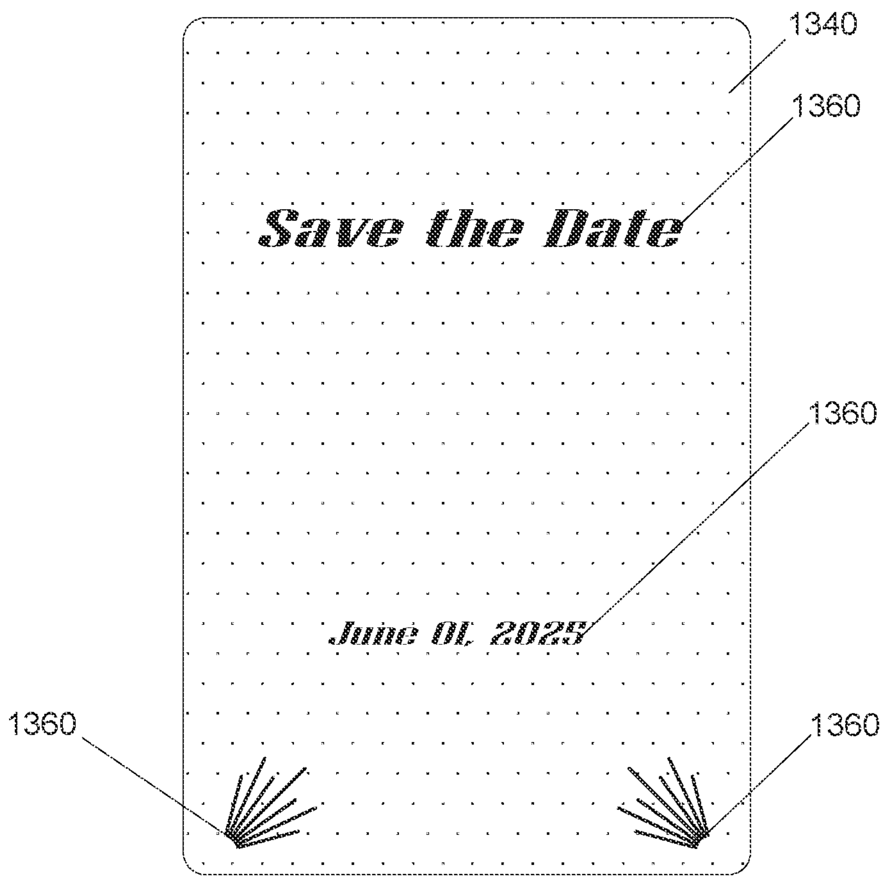
FIG. 14.11
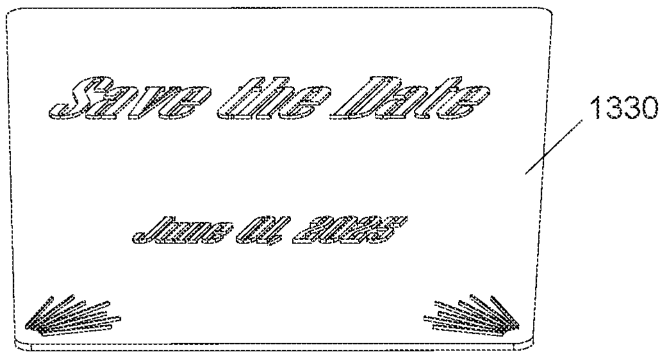
FIG. 15

SYSTEM AND METHOD FOR LETTERPRESS PRINTING

CROSS REFERENCE TO RELATED APPLICATIONS

This application is a continuation in part of U.S. application Ser. No. 29/888,314 filed on Mar. 29, 2023, entitled "Letterpress Plate System," and claims the benefit of priority to U.S. Provisional Patent Application No. 63/455,548 filed on Mar. 29, 2023, entitled "System and Method for a Set of Letterpress Printing".

BACKGROUND

1. Field of the Invention

The field of the present invention generally relates to a technique of printing by transfer of ink and/or relief impression of an inked image on a sheet of paper and the craft of artistic expression using ink and texture on paper. This invention also generally relates to the registration, alignment, positioning, and placing of a system of components for producing a letterpress. Additionally, this invention relates to creating invitations, stationery, greeting cards, or paper related artwork by hand.

2. Description of Related Art

Letterpress is a technique for printing by transfer of ink onto a sheet or roll of paper by use of an ink applied to a raised type and then the raised type is pressed against the sheet such as by a block, die, casting, or stamp and may be used to repeat the same design on many sheets. Letterpress has traditionally been done on large machines such as newspaper printing presses with large roller systems.

So as to reduce the complexity and length of the Detailed Specification, and to fully establish the state of the art in certain areas of technology, Applicant(s) herein expressly incorporate(s) by reference all of the following materials identified in each numbered paragraph below.

U.S. Pat. No. 8,393,266 (Rasmussen) generally describes applying a design on a medium such as a letterpress assembly having a base and platen that may be configured in an open configuration and a closed configuration connected by a hinge. In the open configuration, the base receives the medium and the platen receives a printing plate. The printing plate may include the design to be applied to the medium. A roller assembly may then receive the letterpress assembly in the closed configuration and may exert a compressive force on the letterpress assembly. The compressive force brings the medium into contact with the printing plate and applies the design on the medium.

U.S. Pat. No. 10,960,696 B1 (Garza), U.S. Pat. No. 10,836,193 B2 (Garza), U.S. Pat. No. 10,759,204 B1 (Garza), U.S. Pat. No. 9,931,875 B2 (Myska), U.S. Pat. No. 9,925,812 (Msyka), U.S. Pat. No. 9,849,705 B2 (Myska), U.S. Pat. No. 9,776,443 B1 (Myska), U.S. Pat. No. 9,731,531 B2 (Myska), U.S. Pat. No. 9,597,909 B2 (Myska), US 2021/0060991 A1 (Garza), US 2019/0337314 A1 (Myska), US 2019/0030937 A1 (Myska), US 2018/0147870 A1 (Myska), US 2018/0022134 A1 (Myska), U.S. D948,359 S1 (Garza), U.S. D945,526 S1 (Garza), U.S. D885,482 S (Myska), U.S. D847,227 S1 (Myska), United Kingdom GB 2558988 A (Myska), and other foreign applications claiming priority to these applications generally describe a craftwork tool and kit that provides a portable and/or easy-to-use tool to help users accurately and repeatedly apply stamp impressions and the like to items such as cardstock where a translucent or clear cover portion is connected to a base, the cover portion comprising gridlines and configured to move toward and away from the workspace (movably attached to the base portion or a side portion, for example, by one or more hinges) and where the cover portion comprising an interior surface configured to face the workspace and the interior surface configured to accept an ink stamp that may also include fastening mechanisms, such as magnetic elements, to facilitate placement of the item and/or stamp. The cover may then be opened, the stamp may be inked, and the cover portion may be closed and pressed onto the item to stamp the item while the alignment is maintained by a hinge.

U.S. Pat. No. 11,518,184 B2 (Ericson), U.S. Pat. No. 11,059,312 B2 (Ericson), U.S. Pat. No. 10,518,567 B2 (Ericson), US 2021/0260900 A1 (Ericson) and CA 3081540 A1(Ericson) generally describe a stamping tool where a cover is removably affixed and aligned to the base through a hinging assembly.

US 2011/0011290 A1 (Rasmusssen) generally describes applying a design on a medium including using a letterpress assembly having a base and platen that may be configured in an open configuration and a closed configuration where in the closed configuration a roller assembly may exert a compressive force on the letterpress assembly bringing the medium into contact with the printing plate and applies the design on the medium. Additionally, Rasmussen describes a letterpress with a plurality of compressible spacing members affixed to the letterpress base to allow for the creation of a clear impression of printing plate on medium, while also preventing printing plate from inadvertently coming into contact with medium.

U.S. Pat. No. 5,592,746 A (Ternes) generally describes an image registration board and compressible spacer assembly where it is common practice to space the negative, flat, screen, plate, or masking sheet a short distance away from the ruler and spacer.

U.S. Pat. No. 2,277,405 A (McKiernan) generally describes register method and apparatus where a paper is held in proper position during the registering operation with a substantially type-high surface on the chase, the paper extending over this type-high surface being perforated accurately and engaged by pins accurately positioned in the chase and during a printing operation springs are compressed and the pins are pushed down out of the way.

U.S. Pat. No. 3,103,880 A (Sandford) generally describes a multi-color printing system using a series of pairs of spring pressed register pins corresponding to registration openings and a stripper to position holes on the pins of the supporting frame.

US 2007/0193458 A1 (Cheng) generally describes an impression mold for relief art using a set of retaining hold on the mold area provided with asset of retaining holes and at least a positioning pin.

U.S. Pat. No. 6,240,841 B1 (Newman) generally describes a retractable pallet attachment for screen printing mounted on a printing machine for aligning a screen printing frame with an image platform using a pair of registration mechanisms, such as receding spring pins.

US 2013/0213251 A1 (Styles) generally describes a printer pallet for flat printing of multiple target image areas on 3-dimensional object where the top plate is held securely over a bottom plate and in the closed position provides a compressive force possibly with a locking magnetic latch such that the magnets on the top and bottom plates attract and compress the plates together. Additionally, Styles generally describes using a flat substrate adapter with one or more protruding members position to mate to corresponding recesses in the top surface of the top and bottom plates of the pallet and when a flat substrate such as a sheet of paper is mounted on the top surface of the platen of the adapter, the bottom surface of the flat substrate is fully supported at every point for printing.

US 2012/0186471 A1 (Hutchison) generally describes magnetic chase and graphic arts die assembly with a selectively actuatable means for raising and supporting at least partially of ferromagnetic material die plate during alignment and a chase with a plurality of magnet assemblies.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant(s) will amend the specification to expressly recite the essential material that is incorporated by reference as allowed by the applicable rules.

SUMMARY

Implementations of a method of letterpress printing may comprise providing a letterpress plate system comprising a chase comprising a plurality of magnetic chase registration spring pins, a platen comprising a plurality of magnets, a design plate, an ink, and a paper and placing a magnetic plate having at least one registration mark into a recess of the chase. The method may further comprise placing a die on top of a magnetic insert that is coupled to the chase, placing a paper on a side of the platen with the at least one registration mark facing upward, applying ink to the die, and placing the platen over the chase with the paper facing the die and with the plurality of magnets on the platen compatibly aligned with the magnetic chase registration spring pins. The method may further comprise closing the distance between the platen and the chase to apply the ink to the paper, separating the platen from the chase, and removing the paper from the platen.

Particular aspects may comprise one or more of the following features. The method may further comprise using an ink applicator to apply the ink to the design. The method may further comprise placing one or more shims into the recess area of the base of the chase; and securing the paper to the platen with a temporary adhesive. The method may further comprise using a roller die-cutting machine to close the distance between the platen and the chase.

Implementations of a method of letterpress printing may comprise providing a letterpress plate system comprising a base plate, a silicone sheet, a bottom plate, a top plate comprising a plurality of magnets, an ink, and a paper. The method may further comprise placing the silicone sheet on top of the base plate, placing the bottom plate on top of the silicone sheet, placing a die on top of the letterpress silicone sheet and placing the top plate upside down with the plurality of magnets facing upward. The method may further comprise placing a paper on the top plate, securing the paper to the top plate, removing the top plate, applying ink to the die. The method may further comprise aligning the top plate over and having the paper facing downward with the plurality of magnets of the top plate facing downward toward the base plate, placing the top plate into place on a plurality of base plate registration spring pins to suspend the magnetic top plate above the die with the paper facing the die, pressing the top plate down onto the letterpress plate base to apply the ink to the paper, removing the top plate from the base plate, and removing the paper from the top plate.

Implementations of a system for letterpress printing may comprise a letterpress plate, comprising a first letterpress plate and a second letterpress plate, wherein the second letterpress plate is removably coupled to the first letter press plate, wherein at least one of the first and second letterpress plates comprises a magnet. The system may further comprise a letterpress plate alignment feature, wherein the letterpress plate alignment feature is removably coupled to the letterpress plate, and wherein the letterpress plate alignment feature further comprises a first letterpress alignment feature removably coupled to the first letterpress plate and a second letterpress alignment feature removably coupled to the second letterpress plate. The system may further comprise a registration mark, removably coupled to the letterpress plate and wherein the registration mark further comprises a first letterpress registration mark removably coupled to the first letterpress plate and a second letterpress registration mark removably coupled to the second letter press plate.

Particular aspects may comprise one or more of the following features. The magnet of the at least one of the first and second letterpress plates may be removable. The first letterpress plate may further comprise a first letterpress plate base; a first letterpress plate recess, and a first letterpress plate insert removably coupled to the first letterpress plate base, wherein the first letterpress plate insert comprises at least one of a magnetic first letterpress plate insert, a partially magnetic first letterpress plate insert, and a non-magnetic first letterpress plate insert; and wherein the second letterpress plate further comprises a second letterpress plate base. The letterpress system may further comprise a letterpress design plate, a letterpress bottom plate, a letterpress silicone sheet, a letterpress plate base, and a letterpress magnetic top plate wherein the letterpress plate alignment feature may comprise at least one of an adhesive, a temporary adhesive, a silicone sticky strip, a removable tape, a compressible material, a registration spring, a connector, a magnet, a housing, a post, and a shim.

The letterpress system may further comprise at least one of a handle, a recess, a finger recess, a spacer, and a shim. The letterpress system may further comprise at least one of an ink applicator, an adhesive, and a press. The letterpress plate alignment feature may comprise at least one of a magnetic letterpress plate alignment feature, a post letterpress plate alignment feature, a registration spring pin letterpress plate alignment feature, and a letterpress plate alignment feature sized to be compatible with a letterpress plate alignment feature. The letterpress system may further comprise a letterpress design plate comprising at least one of a letterpress design plate, a die, a hand press, a stamp, a magnetic design plate, a non-magnetic design plate, a plastic design plate, a wood design plate, and a metal design plate, a coated design plate, and a raised design, wherein the raised design comprises at least one of a raised design plate, a raised design die, a raised design stamp, a raised design character, a raised design letter, a raised design symbol, and a raised design icon. The letterpress system may further comprise an ink. The letterpress system may further comprise a paper. The ink applicator may comprise at least one of a pad, a roller, a brush, and a sponge. The adhesive may comprise at least one of a temporary adhesive, a temporary tape, a partially removable adhesive, a partially removable tape, a removable adhesive, a removable tape, a painter's tape, a sticky strip, a silicone sticky strip, a permanent adhesive, and a permanent tape. The letterpress system may further comprise a press comprising a slider machine or a manual hand press. The registration mark may at least partially comprise a grid. The letterpress plate may further comprise a chase comprising a chase base comprising a chase spring pin, a chase post, a chase magnet, a chase recess for a magnetic plate, a chase handle, a chase magnetic sheet. The letterpress system may further comprise a platen, wherein the platen is removably coupled to the chase and further comprises a platen base comprising a platen alignment feature and a platen alignment grommet, wherein the registration mark further comprises a chase registration mark and a platen registration mark.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . "or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION, DRAWINGS, and CLAIMS.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIG. 10 depicts a detailed process diagram of an embodiment of a letterpress plate system with a silicone sheet.

FIG. 14.1 through FIG. 14.11 pictorially depict a general process for creating a letterpress using an embodiment of a letterpress plate system.

FIG. 15 representatively illustrates an embodiment of a letterpress design plate.

Figure 1:
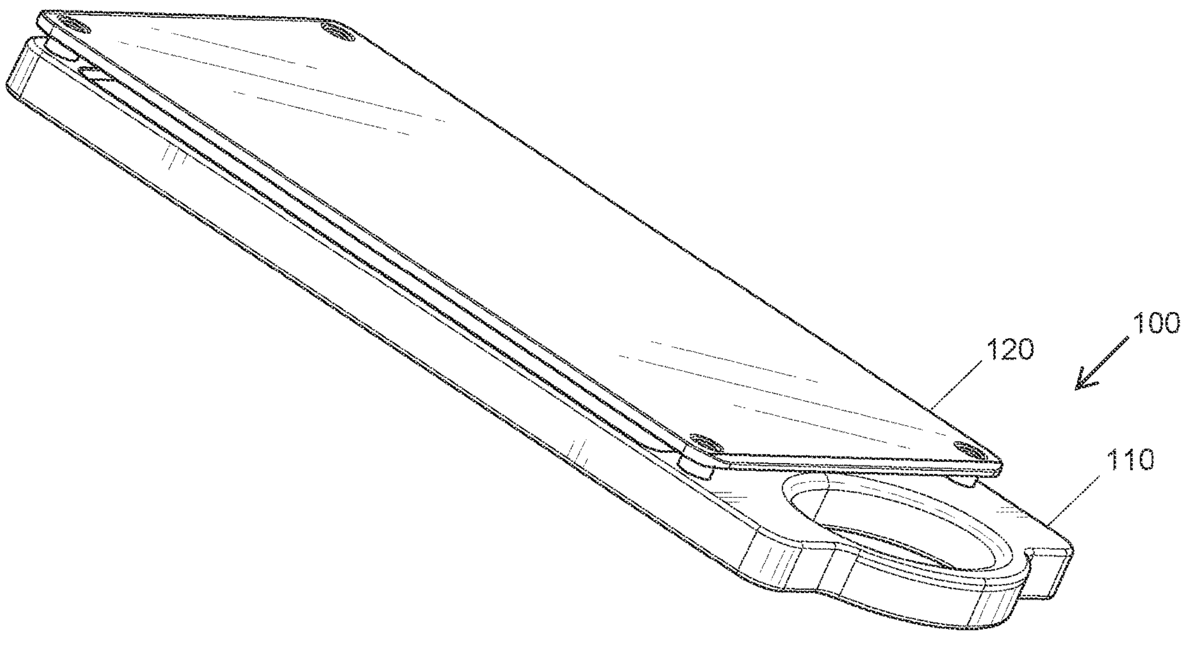
FIG. 1 representatively illustrates a perspective view of an embodiment of a letterpress plate system in a closed uncompressed configuration comprising a first letterpress plate and a second letterpress plate.
Figure 2:
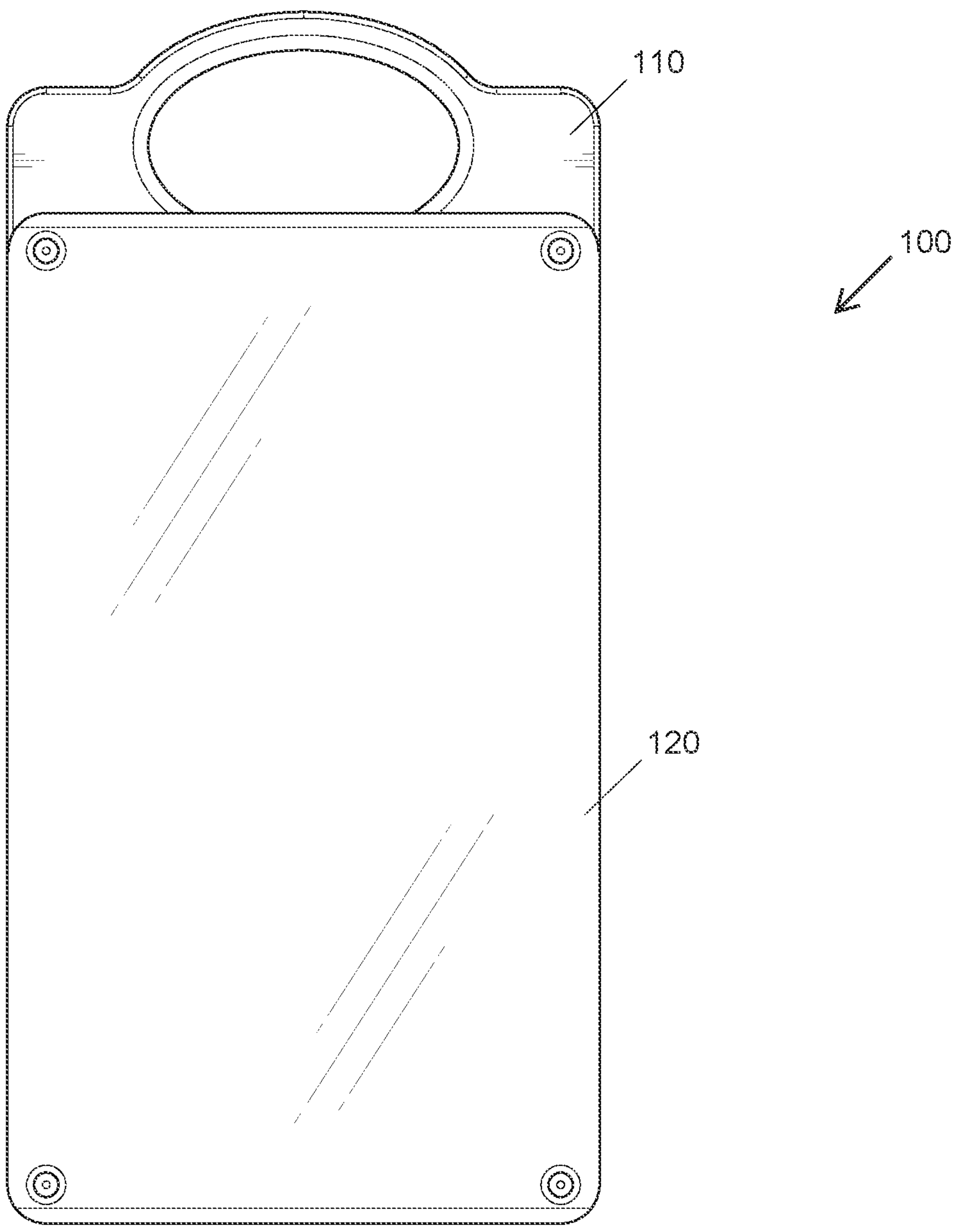
FIG. 2 representatively illustrates a top view of an embodiment of a letterpress plate system.
Figure 3:
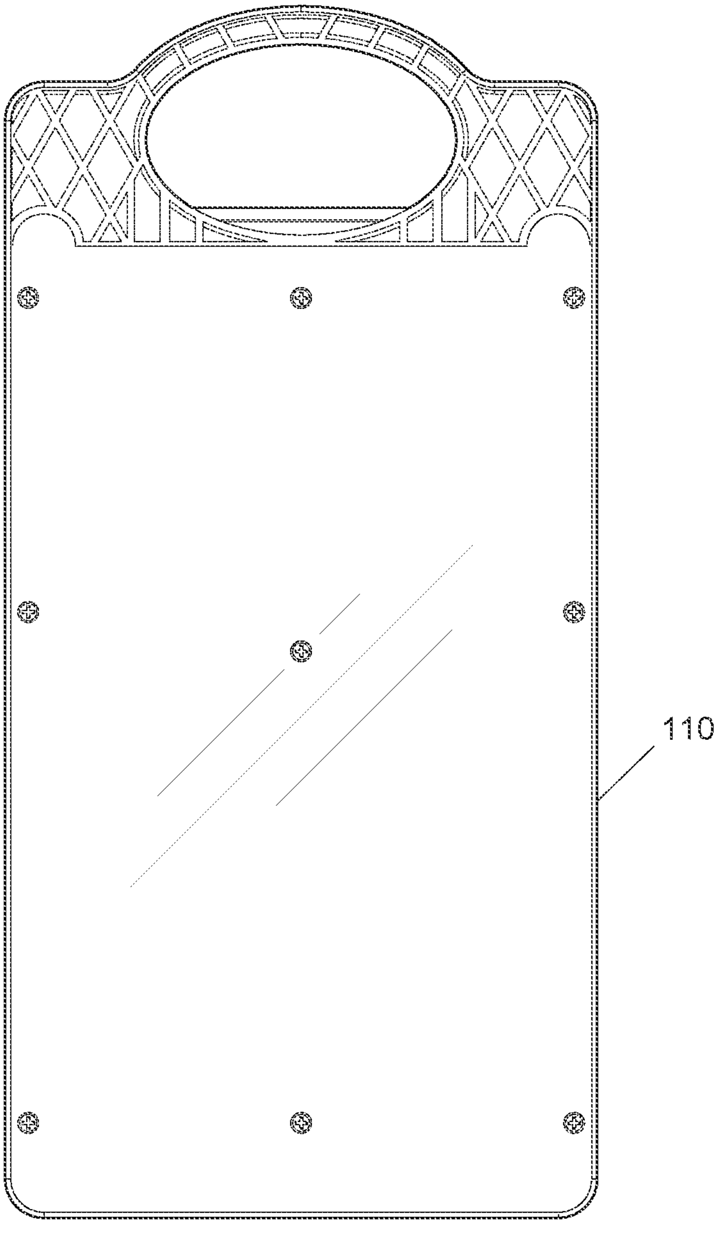
FIG. 3 representatively illustrates a bottom view of an embodiment of a letterpress plate system.
Figure 4:
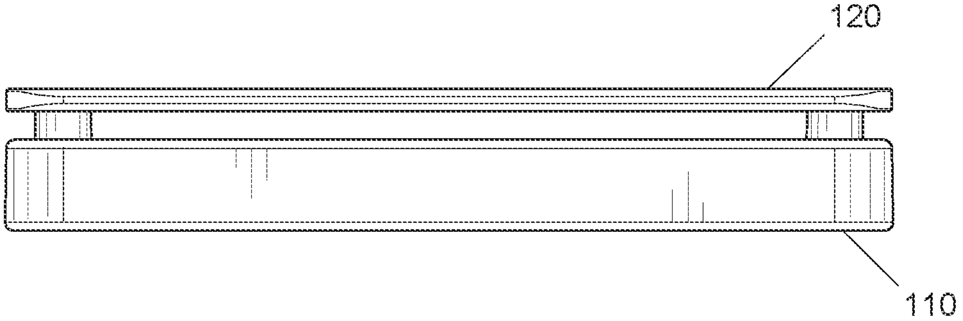
FIG. 4 and FIG. 5 representatively illustrate a first end view and a second end view of an embodiment of a letterpress plate system.
Figure 5:
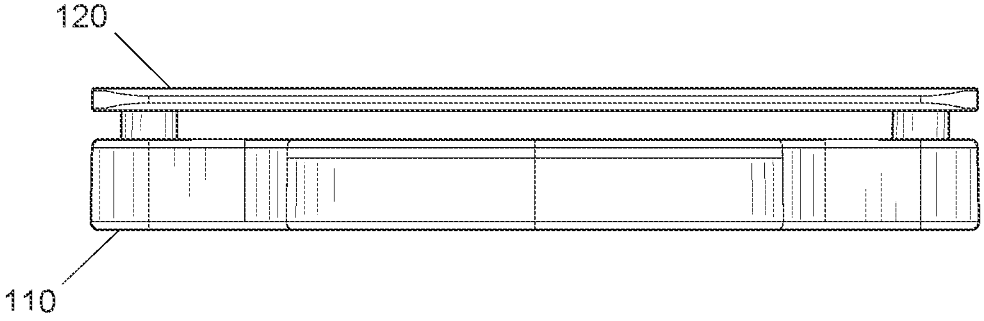
Figure 6:
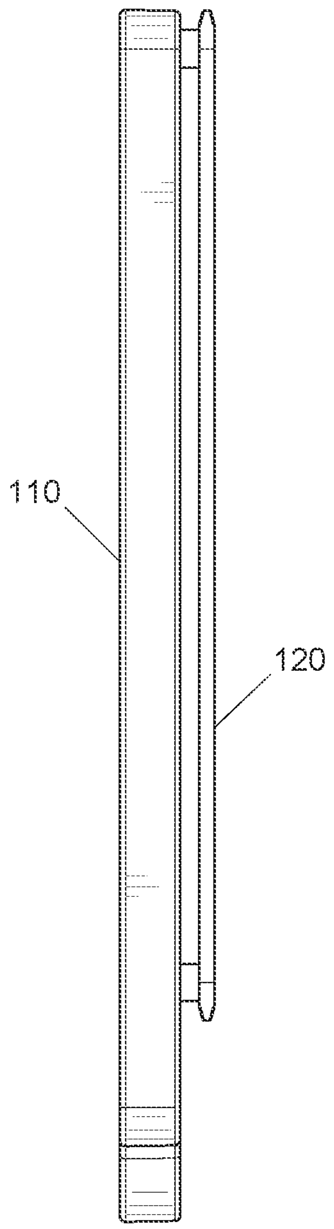
FIG. 6 and FIG. 7 representatively illustrate a first side view and a second side view of an embodiment of a letterpress plate system.
Figure 7:
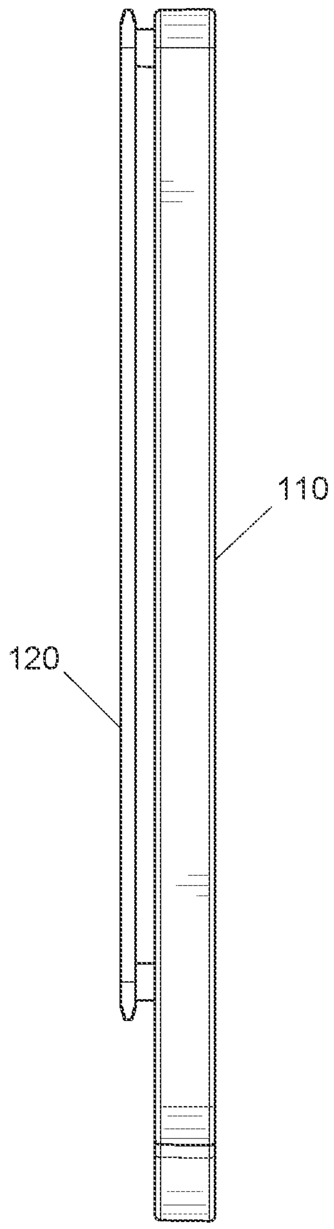

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

A letterpress system, according to various aspects of an embodiment of the invention provides a method and system for creating a letterpress including registration of a paper 1340, registration of a design, and a reduction in movement between the design and the paper when creating a letterpress. In one application, the letterpress system may comprise a letterpress plate system 100, a design, a paper 1340, and an ink 1360. In another embodiment, the letterpress system may comprise a letterpress plate system 100, a design, a paper 1340, an ink 1360, and an ink applicator 1370. In another embodiment, the letterpress system may comprise a letterpress plate system 100, a design, a paper 1340, an ink 1360, and a registration mark 1790. In another embodiment, the letterpress system may comprise a letterpress plate system 100, a design, a paper 1340, an ink 1360, and an adhesive 1350. In another embodiment, the letterpress system may comprise a letterpress plate system 100, a design, a paper 1340, an ink 1360, and a press 1490. In another embodiment, the letterpress system may comprise a letterpress plate system 100, a design, a paper 1340, an ink 1360, a registration mark 1790, an adhesive 1350, and a press 1490. The letterpress system, may however, be configured in any suitable manner to create a letterpress.

The letterpress plate system 100, according to various aspects of an embodiment of the invention provides registration of a paper 1340, registration of a design, and a reduction in movement between the design and the paper when creating a letterpress. In one embodiment, the letterpress plate system 100 may comprise a first letterpress plate 110 and a second letterpress plate 120 as shown in FIG. 1 through FIG. 8. In another embodiment, the letterpress plate system 100 may comprise a letterpress alignment feature 1450 as shown in FIG. 14.9. In another embodiment, the letterpress plate system 100 may comprise a letterpress registration mark 1790. In another embodiment, the letterpress plate system 100 may comprise a letterpress plate base with registration spring pin, a letterpress silicone sheet, a letterpress bottom plate, and a letterpress magnetic top plate, and optionally a sticky silicone strip. In another embodiment, the letterpress plate system 100 may comprise a shim. The letterpress plate system 100, may however, be configured in any suitable manner to couple, secure, register, align, position, or place the paper relative to the design for making a letterpress and interfacing with components of the letterpress system.

The first letterpress plate 110, according to various aspects of an embodiment of the invention provides a surface to permanently or temporarily secure, position, and a align a design, facilitates alignment of a paper 1340 affixed to a second letterpress plate 120 to the design by use of the alignment features, and provides a gap between the design and the paper until the letterpress plate system 100 is compressed and ink is transferred from the design to the paper and/or an impression is created in the paper.

In one embodiment, the first letterpress plate 110 may comprise a first letterpress plate base 1110. In another embodiment, the first letterpress plate 110 may comprise a first letterpress plate registration mark. In another embodiment, the first letterpress plate 110 may comprise a first letterpress plate base 1110 and a first letterpress plate registration mark. In another embodiment, the first letterpress plate 110 may comprise a first letterpress plate alignment feature 1120. In another embodiment, the first letterpress plate 110 may comprise a first letterpress plate base 1110 and a first letterpress plate alignment feature 1120. In another embodiment, the first letterpress plate 110 may comprise a first letterpress plate registration mark and first letterpress plate alignment feature 1120. In another embodiment, the first letterpress plate 110 may comprise a first letterpress plate base 1110, a first letterpress plate alignment feature 1120, and a first letterpress plate registration mark.

Figure 11:
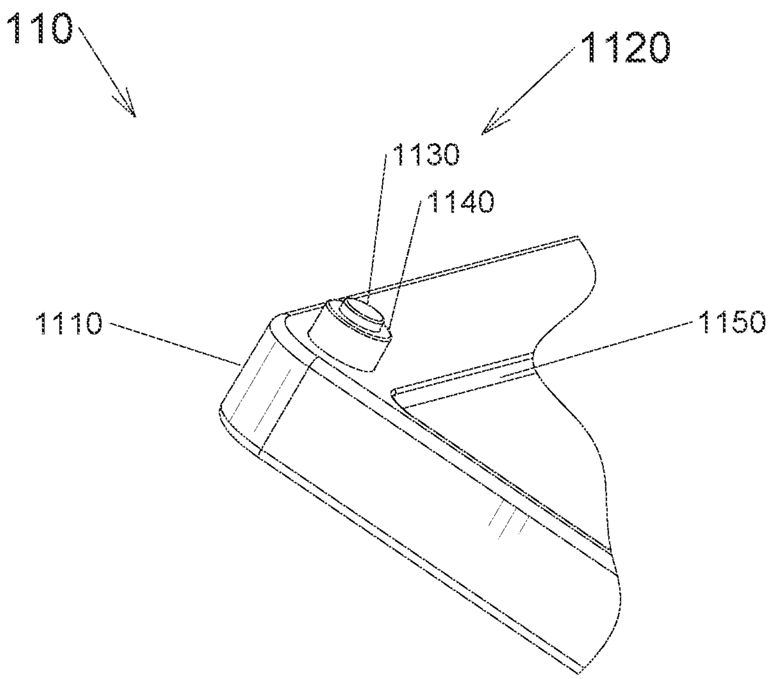
FIG. 11 depicts a detailed view of a section of an embodiment of a first letterpress plate showing a first letterpress plate base comprising a recess configured for a first letterpress plate insert and a first letterpress alignment feature comprising a post, a magnet, and a spring position beneath the post.

In another embodiment, the first letterpress plate 110 may comprise a first letterpress plate insert 1310. In another embodiment, the first letterpress plate 110 may comprise a first letterpress plate base 1110 and a first letterpress plate insert 1310. In another embodiment, the first letterpress plate 110 may comprise a first letterpress plate base 1110 and a first letterpress plate recess 1150 as shown in FIG. 11. In another embodiment, the first letterpress plate 110 may comprise a first letterpress plate registration mark and a first letterpress plate insert 1310. In another embodiment, the first letterpress plate 110 may comprise a first letterpress plate alignment feature 1120 and a first letterpress plate insert 1310. In another embodiment, the first letterpress plate 110 may comprise a first letterpress plate base 1110, a first letterpress plate registration mark, a first letterpress plate alignment feature 1120, and a first letterpress plate insert 1310.

Figure 8:
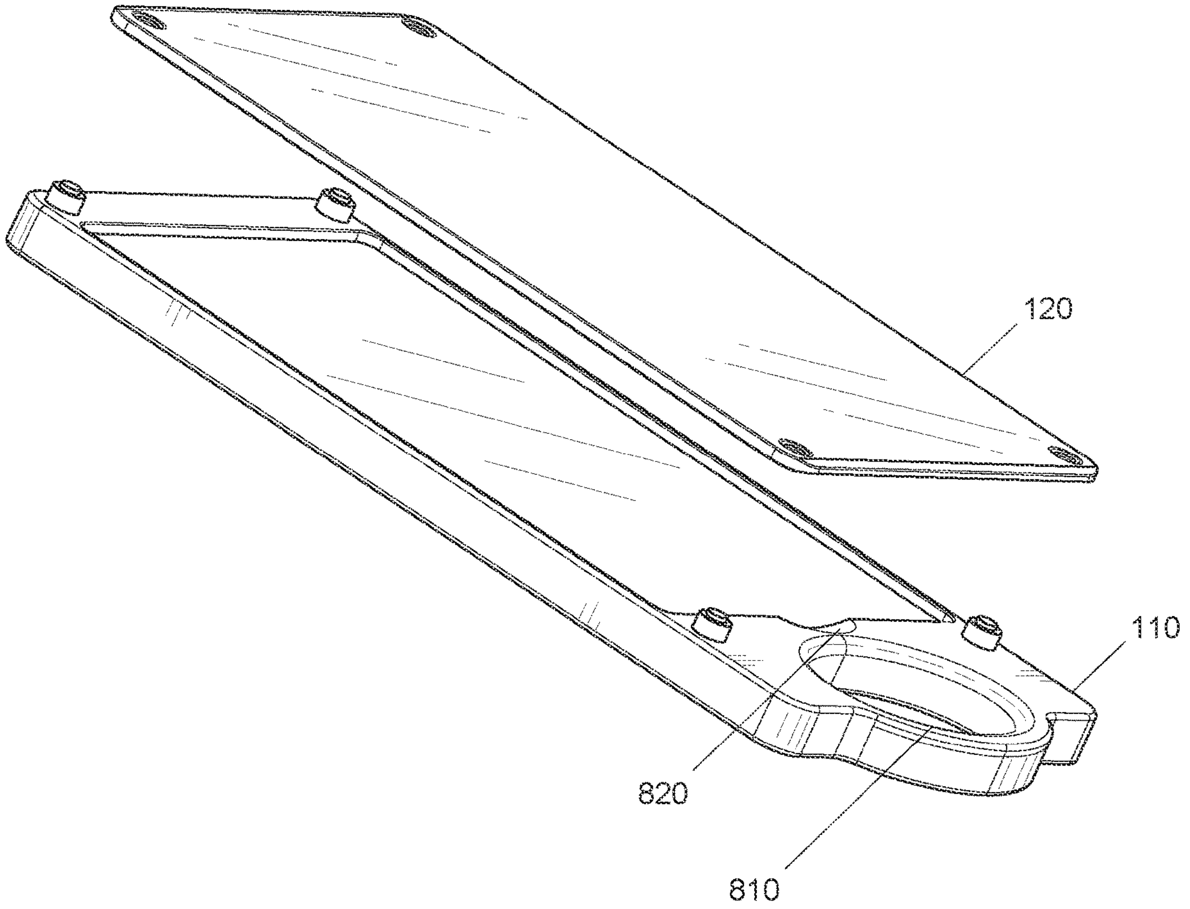
FIG. 8 representatively illustrates a perspective view of an embodiment of a letterpress plate system in an open configuration additionally depicting an optional first letterpress plate handle and an optional first letterpress plate finger recess.

In another embodiment, the first letterpress plate 110 may be configured with an optional first letterpress plate handle 810 as shown in FIG. 8. In another embodiment, first letterpress plate 110 may be configured with an optional first letterpress plate finger recess 820 such as for removing the first letterpress plate insert 1310 from the first letterpress plate base 1110 as shown in FIG. 8. In another embodiment, the first letterpress plate 110 may be configured with an optional first letterpress plate base magnet 1380 configured to be compatible with a design plate 1330 as shown in FIG. 13.

In another embodiment, a first letterpress plate 110 may comprise a chase 1710. In one embodiment, the chase may comprise a chase base 1720, a chase plate such as a chase magnetic plate, an optional chase registration mark such as a chase A7 registration mark, a chase A2 registration mark, a chase vertical registration mark such as a registration line substantially vertical relative to the chase, a chase horizontal registration mark such as a registration line substantially horizonal relative to the chase, a chase alignment feature such as a spring, a magnet, or a post, and optionally a chase handle.

Figure 13:
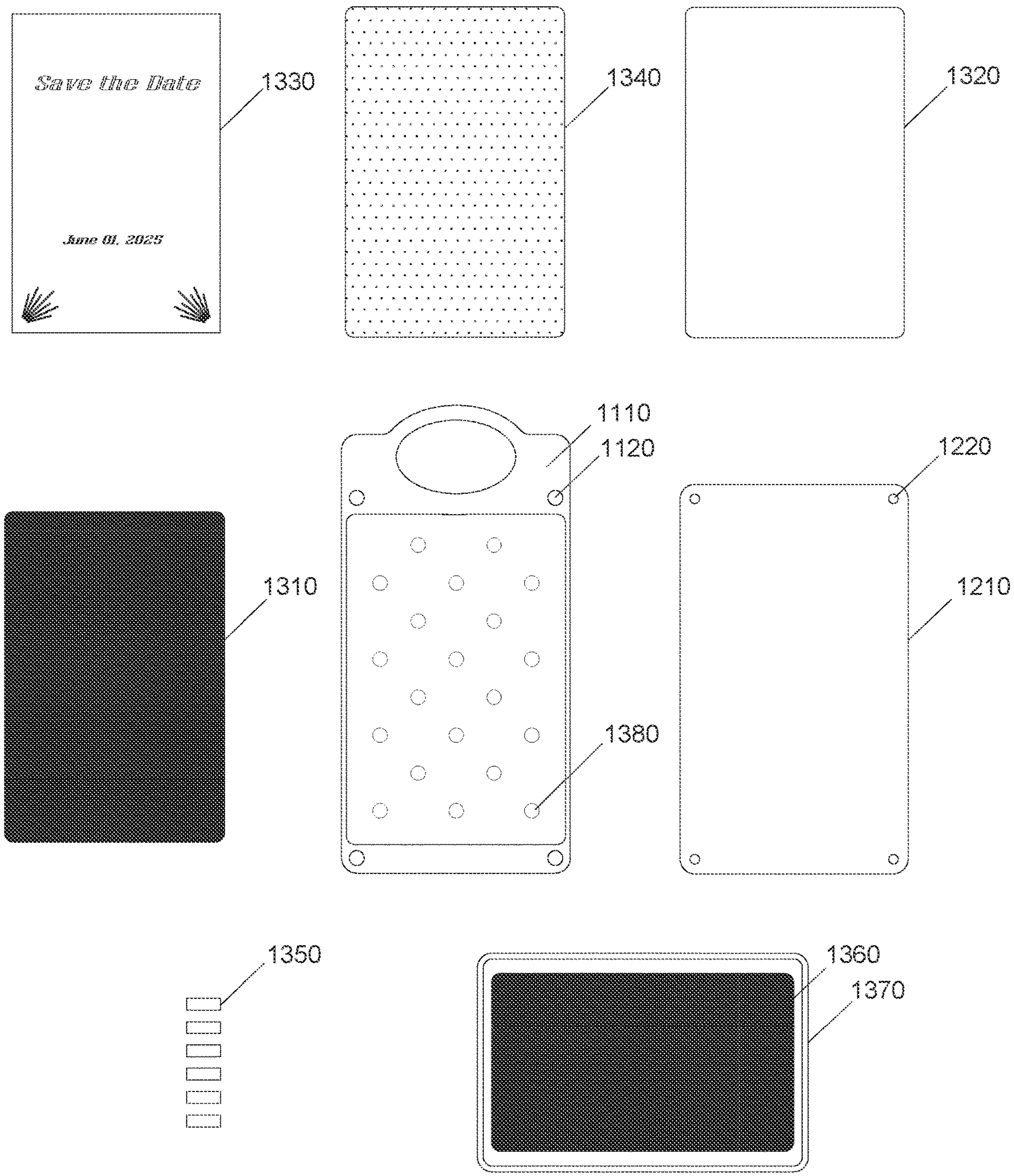
FIG. 13 representatively illustrates an embodiment of a letterpress plate system comprising a base plate, a design plate, a bottom plate, a silicone sheet, a magnetic top plate, an ink pad, and a sticky silicone strip.
Figure 16A:
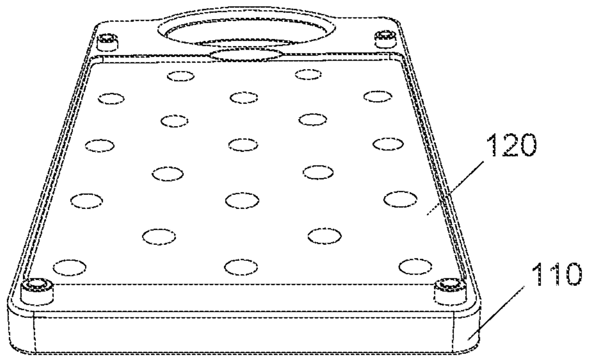
FIG. 16A, through FIG. 16E representatively illustrate embodiments of a letterpress plate base and a letterpress alignment feature.
Figure 16B:
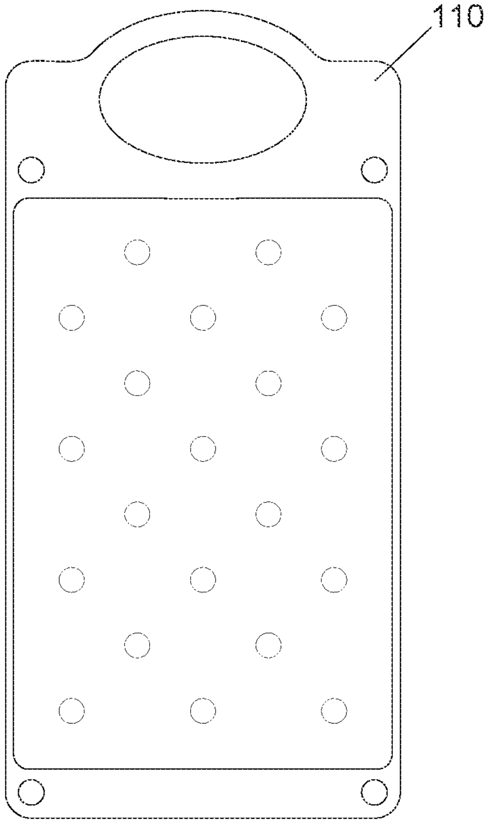
Figure 16C:
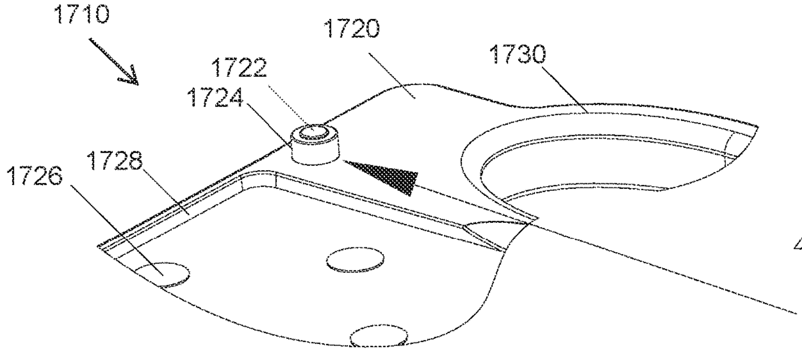
Figure 16D:
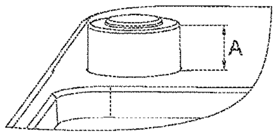
Figure 16E:
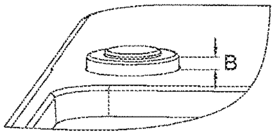

In another embodiment, first letterpress plate 110 may comprise a first letterpress plate base 1110, a letterpress bottom plate 1310, a letterpress plate insert 1320 such as a silicone sheet, and a first letterpress alignment feature 1120 and optionally a first letterpress plate base magnet 1380 as shown in FIG. 13.

In another embodiment, first letterpress plate 110 may be configured as a variable shaped first letterpress plate such as a square first letterpress plate, a rectangle first letterpress plate, a custom first letterpress plate such as a first letterpress plate configured to be compatible with a custom shaped second letterpress plate or a press 1490.

The first letterpress plate 110, may however, be configured in any suitable manner to couple to the design, couple to and align with the second letterpress plate 120, or interface with components of the letterpress system.

The first letterpress plate insert 1310, according to various aspects of an embodiment of the invention provides a variable height surface for securing, aligning, position, and placing a design onto components of the letterpress system for producing a letterpress.

In one embodiment, the first letterpress plate insert 1310 may comprise a first letterpress magnetic plate. In another embodiment, the first letterpress plate insert 1310 may comprise a first letterpress magnetic plate and a first letterpress shim. In another embodiment, the first letterpress plate insert 1310 may comprise a first letterpress magnetic plate registration mark. In another embodiment, the first letterpress plate insert 1310 may comprise a first letterpress magnetic plate and a first letterpress magnetic plate registration mark. In another embodiment, the first letterpress plate insert 1310 may comprise a first letterpress magnetic plate, a first letterpress shim, and a first letterpress magnetic plate registration mark.

In another embodiment, the first letterpress plate insert 1310 may be configured as a variable thickness first letterpress plate insert or a standardized thickness first letterpress plate insert. In one embodiment, the variable thickness first letterpress plate insert may be configured as a thin thickness first letterpress plate insert, a medium thickness first letterpress plate insert, or a thick first letterpress plate insert, about 0 inch to about a 0.2 inch thick first letter press insert, about a 0 inch to about a 0.5 inch thick first letterpress plate insert, or larger than a 0.5 inch thick first letterpress plate insert. In another embodiment, the variable thickness first letterpress plate insert may be configured as a consistently thick first letter press insert such as variable first letterpress plate insert that is the same thickness throughout its size or a variably thick first letterpress plate insert such a first letterpress plate insert 1310 that has different thickness throughout its size.

In another embodiment, first letterpress plate insert 1310 may be configured with a variable shape such as a square first letterpress plate insert, a rectangular first letterpress plate insert, a circular first letterpress plate insert, an oval first letterpress plate insert, or other custom shaped first letterpress plate insert.

In another embodiment, first letterpress plate insert 1310 may be configured with a variable size such as a US unit-based size first letterpress plate insert, a European-unit based first letterpress plate insert, another standardized-unit based first letterpress plate insert, a relationally sized first letterpress plate insert to relative other components of the letterpress system, or a custom sized first letterpress plate insert. In another embodiment, the first letterpress plate insert 1310 may be configured with a registration mark 1790. In one embodiment, the first letterpress plate insert 1310 may be configured as a plastic material, a metal material, a metallic material, a ferromagnetic material, a paper material, a custom material, or a combination of materials.

In another embodiment, the first letterpress insert 1310 may be configured as a single material such as a single-sided first letterpress plate insert or a multiple material combination such as a two-sided first letterpress plate insert.

In one embodiment, the first letterpress shim may be configured as a thin thickness first letterpress plate shim, a medium thickness first letterpress plate shim, or a thick first letterpress plate shim, about 0 inch to about a 0.2 inch thick first letter press shim, about a 0 inch to about a 0.5 inch thick first letterpress plate shim, a larger than a 0.5 inch thick first letterpress plate shim, or any suitable thickness for providing a spacer between the design and the paper when the first letterpress plate 110 and the second letterpress plate 120 are pressed or not pressed together. In another embodiment, the first letterpress shim may be configured as a silicone sheet. In another embodiment, the first letterpress shim may be configured as one first letterpress shim or more than one first letterpress shim.

The first letterpress plate insert 1310, may however, be configured in any suitable manner to provide a surface to couple the design to the first letterpress plate 110, adjust the height between the design and the paper prior to compression and during compression when the ink 1360 is transferred to the paper 1340 and creates an optional relief on the paper or interface with components of the letterpress system.

Figure 12:
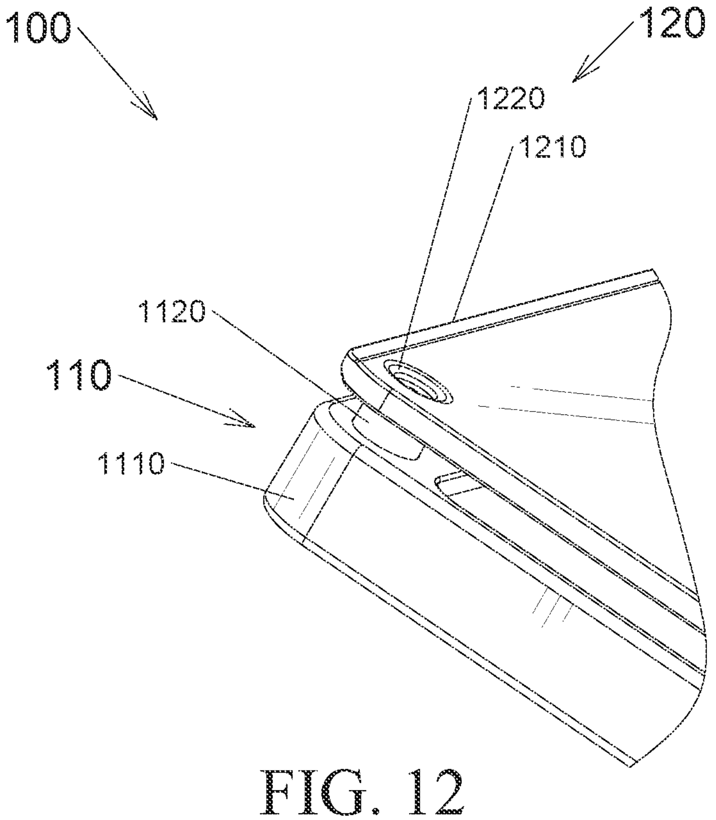
FIG. 12 depicts a detailed view of a section of an embodiment of a first letterpress plate showing a first letterpress plate base and a first letterpress alignment feature and a second letterpress plate showing a second letterpress plate base and a second letterpress alignment feature.

The first letterpress plate alignment feature 1120, according to various aspects of an embodiment of the invention provides security, alignment, position, and placement for components of the letterpress system when coupled to the second letterpress alignment feature 1220. In one embodiment, the first letterpress plate alignment feature 1120 may comprise a magnet. In another embodiment, the first letterpress plate alignment feature 1120 may comprise a first letterpress magnet and a first letterpress magnet housing such as a post 1140 configured to support the first letterpress magnet. In another embodiment, the first letterpress plate alignment feature 1120 may be configured as a button, a ring, a grommet, a washer, or other material configured to be compatible, such as magnetically compatible, to the second letter press alignment feature 1220 as shown in FIG. 11 and FIG. 12. In another embodiment, the first letterpress plate alignment feature 1120 may be configured as a magnetic first letterpress alignment feature or a non-magnetic first letterpress alignment feature configured to be compatible with the second letterpress plate alignment feature 1220.

In another embodiment, the first letterpress plate alignment feature 1120 may be configured as one first letterpress plate alignment feature 1120 or more than one first letterpress plate alignment feature 1120 such as to provide multiple point registration over more than just one side of the letterpress system such as the corners, edges, or throughout the letterpress plate system 100 improving the precision of the attachment between the first letterpress plate 110 and the second letterpress plate 120 and therefore improving the precision of the registration between the design and the paper.

In another embodiment, the first letterpress plate alignment feature 1120 may comprise a first letterpress registration spring pin. In one embodiment, the first letterpress registration spring pin may comprise a compressible material and a connector compatible with the second letterpress plate alignment feature 1220. In another embodiment, the first letterpress registration spring pin may comprise a spring, a magnet 1130, and a post 1140 as shown in FIG. 11 and FIG. 12. In another embodiment the first letterpress registration spring pin may be configured as a variable height first letterpress registration spring pin such as a variable first height that sets a first predefined gap between the first letterpress plate 110 when coupled to and not pressed against the second letterpress plate 120, a second variable height that sets a second predefined gap between the first letterpress plate 110 when coupled to and pressed against the second letterpress plate 120, another custom height that determines a variable gap when the first letterpress plate 110 is coupled to the second letterpress plate 120, or a combination of first, second, and more custom heights.

In one embodiment, the variable height first letterpress registration spring pin may be configured to provide about a 0 inch gap, about a 0 inch gap to about a 1 in gap, about a 0.25 inch gap to about a 5 inch gap, or larger than a 5 inch gap. In another embodiment, the variable height first letterpress registration spring pin may be configured to provide a first gap height when the first letterpress plate 110 is coupled to a first side of the second letterpress plate 120 and a second gap height when the first letterpress plate 110 is coupled to a second side of the second letterpress plate 120. In another embodiment, the variable height first letterpress registration spring pin may be configured to provide a gap height relative to a pressure applied between the first letterpress plate 110 and the second letterpress plate 120 such as a pressured applied manually by a hand pressure or a variable pressure applied by a roller to the first letterpress plate 110 and the second letterpress plate 120.

The first letterpress plate alignment feature 1120, may however, be configured in any suitable manner to couple to the second letterpress alignment feature 1220 or interface with components of the letterpress system.

The second letterpress plate 120, according to various aspects of an embodiment of the invention provides a surface to permanently or temporarily secure, position, and a align a paper 1340, facilitates alignment of a design affixed to a first letterpress plate 110 to the paper by use of the alignment features, and provides a gap between the design and the paper until the letterpress plate system 100 is compressed and ink is transferred from the design to the paper and/or an impression is created in the paper.

In one embodiment, the second letterpress plate 120 may comprise a second letterpress plate base 1210. In another embodiment, the second letterpress plate 120 may comprise a second letterpress plate registration mark. In another embodiment, the second letterpress plate 120 may comprise a second letterpress plate base 1210 and a second letterpress plate registration mark. In another embodiment, the second letterpress plate 120 may comprise a second letterpress plate alignment feature 1220. In another embodiment, the second letterpress plate 120 may comprise a second letterpress plate base 1210 and a second letterpress plate alignment feature 1220. In another embodiment, the second letterpress plate 120 may comprise a second letterpress plate base 1210, a second letterpress plate registration mark, and a second letterpress plate alignment feature 1220. In another embodiment, the second letterpress plate 120 may be configured with an optional second letterpress plate handle. In another embodiment, the second letterpress plate 120 may be configured with a material compatible with the adhesive 1350.

In another embodiment, the second letterpress plate 120 may comprise a platen. In one embodiment, platen may comprise a platen base, a platen alignment feature such as a platen alignment magnet, aplaten alignment grommet 1780 as shown in FIG. 17C, and an optional platen registration mark such as a platen A7 registration mark, a platen A2 registration mark, a platen vertical registration mark such as a registration line substantially vertical relative to the platen, a platen horizontal registration mark such as a registration line substantially horizontal relative to the. In another embodiment, the second letterpress plate 120 may comprise a letterpress magnetic top platen, a letterpress magnetic top magnet plate, a paper 1340, and an optional ink applicator 1370 as shown in FIG. 13.

In another embodiment, the second letterpress plate 120 may be configured with a registration mark 1790. In another embodiment, the second letterpress plate 120 may be configured as a variable shaped second letterpress plate such as a square second letterpress plate, a rectangle second letterpress plate, a custom second letterpress plate such as a second letterpress plate configured to be compatible with a custom shape first letterpress plate 110 or a press 1490.

The second letterpress plate 120, may however, be configured in any suitable manner to couple to the paper, couple to and align with the first letterpress plate 110, or interface with components of the letterpress system.

The second letterpress alignment feature 1220, according to various aspects of an embodiment of the invention provides security, alignment, position, and placement for components of the letterpress system when coupled to the first letter press alignment feature 1120. In one embodiment, the second letterpress alignment feature 1220 may comprise a magnet. In another embodiment, the second letterpress alignment feature 1220 may comprise a second letterpress magnet and a second letterpress magnet recess such as a recess configured to house the second letterpress magnet. In another embodiment, the second letterpress alignment feature 1220 may be configured as a grommet, a washer, or other material configured to be compatible such as magnetically compatible with the first letterpress alignment feature 1120. In another embodiment, the second letterpress alignment feature 1220 may be configured as a magnetic second letterpress alignment feature or a non-magnetic second letterpress alignment feature configured to be compatible with the first letterpress alignment feature 1120.

In another embodiment, the second letterpress plate alignment feature 1220 may be configured as one second letterpress plate alignment feature 1120 or more than one second letterpress plate alignment feature 1220 such as to provide multiple point registration over more than just one side of the letterpress system such as the corners, edges, or throughout the letterpress plate system improving the precision of the attachment between the second letterpress plate 110 and the second letterpress plate 120 and therefore improving the precision of the registration between the design and the paper.

The second letterpress alignment feature 1220, may however, be configured in any suitable manner to couple to the first letter press alignment feature 1120 and interface with components of the letterpress system.

The registration mark 1790, according to various aspects of an embodiment of the invention provides a visualization of alignment, position, placement, and repeatability within and between features related to producing a letterpress. In one embodiment, the registration mark 1790 may comprise an image such as a line and a material such as a printed ink as shown in FIG. 17B,. In another embodiment, the registration mark 1790 may be configured as a line registration mark such as a substantially horizontal or vertical registration mark relative to a component of the letterpress system or a substantially not linear registration mark such as a curved registration mark. In another embodiment, the registration mark 1790 may be configured as a grid registration mark such as a set of substantially horizontal or vertical registration marks in a grid pattern such as a small or fine grid, a medium grid, or a large or coarse grid, a standardized size grid such as metric unit gird or an English unit grid, a symmetric grid, or an asymmetric grid, or another grid custom pattern. In another embodiment, the registration mark 1790 may be configured as a shaped registration mark such as an "L" shaped registration mark, an "X" shaped registration mark, or another custom character or symbol shaped mark. In another embodiment, the registration mark 1790 may be configured as a "tick" mark such as a temporary mark made by a grease pen for alignment within or between a design. In another embodiment, the registration mark 1790 may be configured as a custom pattern such as a custom registration mark configured for a specific design. In another embodiment, the registration mark 1790 may be configured as a sized registration mark such as US-based unit of measure sized registration mark, a European-based unit of measure sized registration mark such as a registration mark sized for an A2 or A7 size paper, another standardized-based unit of measure sized registration mark, or other custom sized registration mark. In another embodiment, the registration mark 1790 may be configured as a removable or temporary registration mark such as a registration mark made by a grease pen, a semi-removable registration mark such as a sticker, or a permanent registration mark such as registration mark printed on or affixed to the surface of a component of the letterpress system.

The registration mark 1790, may however, be configured in any suitable manner to provide a template for precision, alignment, and placement of a design relative to a paper 1340 or interface with components of the letterpress system.

Figure 9:
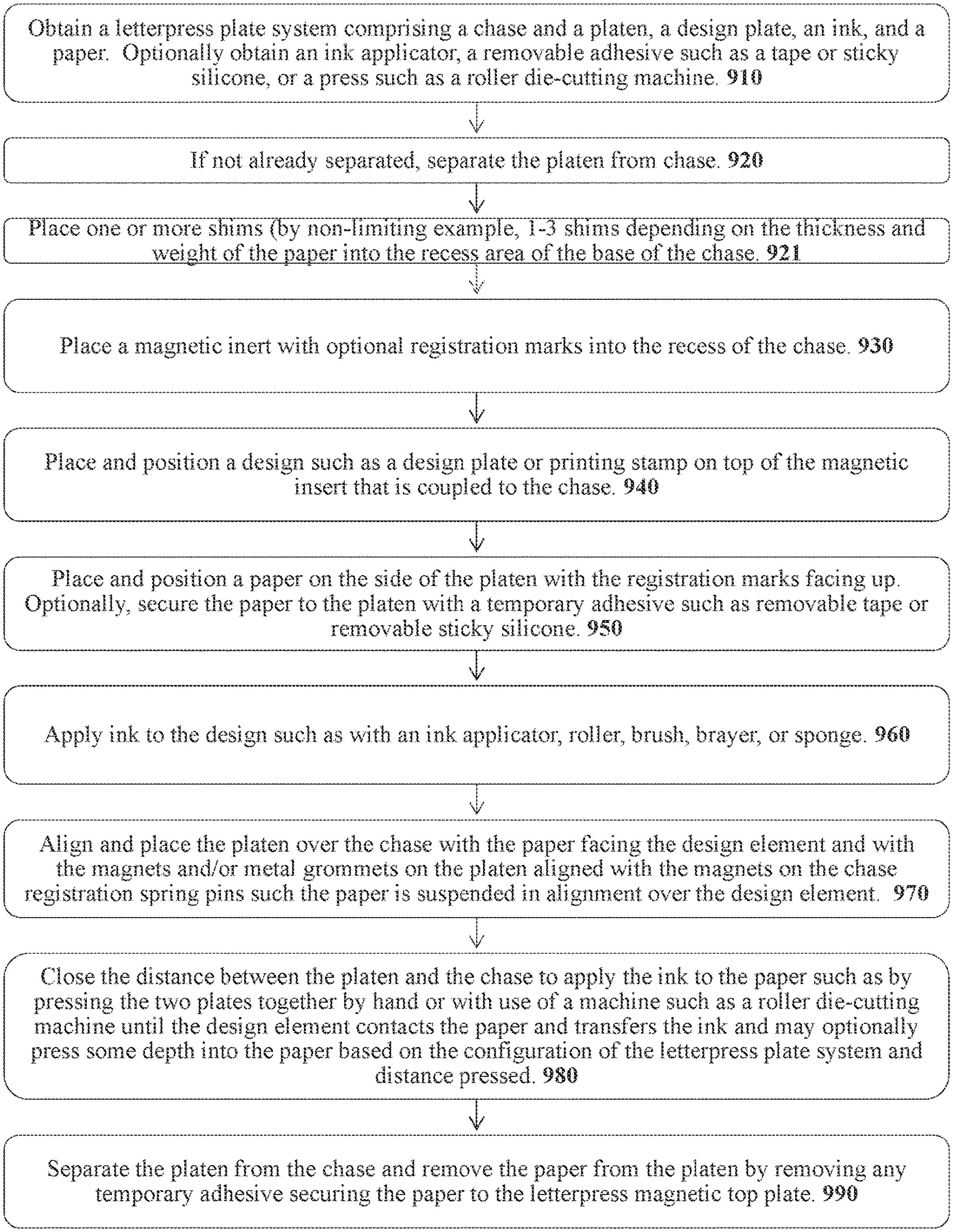
FIG. 9 depicts a general process diagram of an embodiment of a letterpress plate system described as a chase and a platen.

The design, according to various aspects of an embodiment of the invention provides a visual or tactile artwork, a word, a template, or a script for the letterpress. In one embodiment, the design may be configured as a design plate 1330, a plate with a raised design and optionally a coating applied to the plate. In another embodiment, design may be configured as a raised type, a design die, a design stamp, or a custom design plate. In another embodiment, the design may be configured as a magnetic material or a non-magnetic material such as a magnetic design plate or a silicone sticky design plate. In another embodiment, the design may be configured as a plastic design plate, a metal design plate, a wood design plate, a silicone-based plate, a paper-based plate, or other custom type of material. In another embodiment, the design may be configured as a shape, an image, a letter, a word, a character, a symbol, a photograph, or other custom imagery. In another embodiment, the design may be configured to be compatible with a manual press such as a manual hand press as shown in FIG. 9 and FIG. 10, a press 1490 as shown in FIG. 14.10A and FIG. 14.10B such as a semi-automated press such as a slider machine, or an automated press such as an automated printing press. The design, may however, be configured in any suitable manner to communicate an idea, an image, a tactile feeling, a writing, or an artwork or interface with components of the letterpress system.

The ink 1360, according to various aspects of an embodiment of the invention provides a visual and optionally tactical artwork for a letterpress. In one embodiment, ink 1360 may comprise a custom composition further comprising of a vehicle such as an oil, optionally a pigment such as a white pigment, a black pigment, a red pigment, a green pigment, a yellow pigment, a blue pigment, a cyan pigment, or a magenta pigment, optionally a binder such as a resin or a wax, and optionally an additive such as a drying agent. In one embodiment, the ink may be configured as a composition that has no color or pigment, one color, or more than one color such as a first ink and a second ink. In another embodiment, the ink 1360 may be configured as a composition that has a variable thickness or consistency such as a thin ink, a medium ink, a thick ink, or a custom thickness ink such as an ink designed to stand up, stick to, partially flow, or flow on the surface of the design. In another embodiment, the ink 1360 may be configured as a composition that allows the ink 1360 to be applied to the design by an ink applicator 1370 such as an ink pad, an ink roller, an ink sponge, an ink brush, or another type of custom method of applying ink to the service of the design. In another embodiment, the ink 1360 may be configured as a variable type of ink such as a liquid ink, a semi-liquid ink, a dye-based ink, a water-based ink, a rubber-based ink, an oil-based ink, a glycol-based ink, a mineral-based ink, an organic ink, a synthetic ink, a hybrid organic and synthetic ink, a food-grade ink, a hypo-allergenic ink, a washable-ink, a conductive ink, a non-conductive ink, or a custom type of ink. The ink 1360, may however, be configured in any suitable manner to provide a visual representation or tactile representation of a design and to interface with components of the letterpress system.

The ink applicator 1370, according to various aspects of an embodiment of the invention provide a way to transfer a supply of ink onto the design. In one embodiment, the ink applicator 1370 may be configured as an ink pad, an ink roller, an ink brush, an ink sponge, or other custom ink applicator. The ink applicator 1370, may however, be configured in any suitable manner to transfer ink and interface with components of the letterpress system.

The paper 1340, according to various aspects of an embodiment of the invention provides a substrate with which to apply ink and/or make an impression during the process of creating a letterpress. In one embodiment, the paper 1340 may be configured as variable sized paper such as an American size paper, a European size paper such as an A2 size paper or an A7 size paper, another standardized size paper, or a custom sized paper. In another embodiment, the paper 1340 may be configured as a variable shaped paper such as a square shaped paper, a rectangle shaped paper, a circular shaped paper, an oval shaped paper, a triangular shaped paper, a symmetric paper, an asymmetric paper, a regular shaped paper, an irregular shaped paper, or a custom shaped paper. In another embodiment, the paper 1340 may be configured as a variable thickness paper such as a about a uniformly thick paper, about a non-uniform thickens papers such as a paper that changes thickness over its size and shape, a thin thickness paper, a medium thickness paper, a thick thickness paper, or a custom thickness paper. In another embodiment, the paper may be configured as a variable material such as a standard paper, a high-quality cotton paper, a watercolor paper, a cardstock, a cloth material, a polymer material, an organic material, a synthetic material, a custom paper material, or a combination of materials. In another embodiment, the paper may be configured to generate a two-dimensional design or a three-dimensional design. The paper 1340, may however, be configured in any suitable manner to facilitate the process of creating a letterpress or interfacing with components of the letterpress system.

The adhesive 1350, according to various aspects of an embodiment of the invention provides a way of temporarily securing and aligning the design to the first letterpress plate 110 or the paper to the second letterpress plate 120 during the letterpressing process as shown in FIG. 14.1 through FIG. 14.9. In one embodiment, the adhesive 1350 may be configured as a removable adhesive, a removable tape such as a painter's tape, a silicone sticky strip, or other suitable system for securing the paper 1340 to the second letterpress plate 120. In another embodiment, the adhesive 1350 may be configured as removable from, partially removable from, integrated with, coupled to the paper1340, coupled to the first letterpress plate 110, or coupled to the second letterpress plate 120. In another embodiment, the adhesive 1350 may be configured with a material compatible with the design, the paper 1340, the first letterpress plate 110, or the second letterpress plate 120. The adhesive 1350, may however, be configured in any suitable manner to secure and interface with components of the letterpress system.

The press 1490, according to various aspects of an embodiment of the invention provides for a manual, a machine, or an automated way of closing the gap between the paper 1340 and design until the ink 1360 is transferred to the paper 1340 or the design pressed some depth into the paper 1340. In one embodiment, the press may comprise any suitable system for closing the gap between the letterpress plate system as shown in FIG. 14.10A and FIG. 10.B. The press 1490, may however, be configured in any suitable manner to close the gap the design and the paper or between components the letterpress plate system, or interface with components of the letterpress system.

Figure 17A:
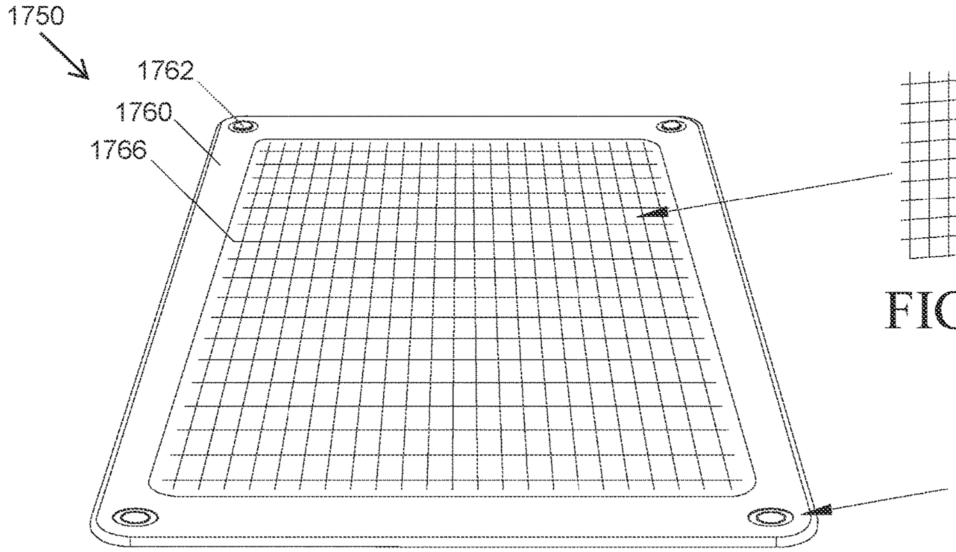
FIGS. 17A-C representatively illustrate an embodiment of a letterpress magnetic top plate.
Figure 17B:
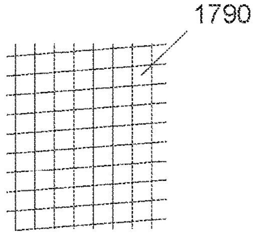
Figure 17C:
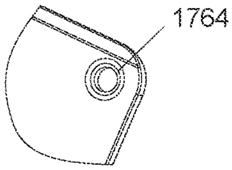

In another application, the letterpress plate system 100 may comprise a first letterpress plate 110 configured as a chase 1710 comprising a chase base 1720, a chase spring pin 1722, a chase post 1724, a chase magnet 1726, a chase recess for magnetic plate 1728, a chase handle 1730, and a chase magnet sheet, and a second letterpress plate 120 configured as a platen 1750 comprising a platen base 1760 comprising a platen alignment feature 1762, and a platen aliment grommet 1764, and wherein the registration mark 1790 may be configured as a chase registration mark and a platen registration mark 1766 as shown in FIG. 17A, FIG. 17B, and FIG. 17C.

The letterpress system according to various aspects of an embodiment of the invention provides for various configurations that may be used to generate designs on a paper such as by obtaining a letterpress plate system comprising a chase and a platen, a design plate, an ink, and a paper, optionally an ink applicator, optionally a removable adhesive such as a tape or sticky silicone, or optionally a press such as a slider machine 910, and if not already separated, separating the platen from chase 920, then placing a magnetic plate with optional registration marks into the recess of the chase 930, placing and positioning a design such as a design plate or printing stamp on top of the magnetic plate that is coupled to the chase 940, placing and positioning a paper on the side of the platen with the registration marks facing up, and optionally securing the paper to the platen with a temporary adhesive such as removable tape or removable sticky silicone 950, applying an ink to the design such as with an ink applicator, roller, brush, or sponge 960, aligning and placing the platen over the chase with the paper facing the design element and with the magnets on the platen aligned with the magnets on the chase registration spring pins such the paper is suspended in alignment over the design element 970, closing the distance between the platen and the chase to apply the ink to the paper such as by pressing the two plates together by hand or with use of a machine such as a slider machine until the design element contacts the paper and transfers the ink and may optionally presses some depth into the paper based on the configuration of the letterpress plate system and distance pressed 980, and then separating the platen from the chase and removing the paper from the platen by removing any temporary adhesive securing the paper to the letterpress magnetic top plate 990 as shown in FIG. 9.

The letterpress system according to various aspects of an embodiment of the invention also provides for various configurations that may be used to generate a design on paper by obtaining a letterpress plate system, a design plate or other letterpress design tool, an ink, and a paper and optionally obtaining an ink applicator, a removable adhesive such as a tape or sticky silicone, or a press such as a slider machine 1005, placing a first letterpress insert such as a letterpress silicone sheet on top of the letterpress plate base 1010, placing a letterpress bottom plate on top of the letterpress silicone sheet 1015, placing and positioning a design plate on top of the letterpress silicone sheet 1020, placing a letterpress magnetic top plate upside down with the letterpress magnetic top plate magnets facing up 1025, placing and positioning a paper on the magnetic top plate 1030, securing the paper to the letterpress magnetic top plate with a temporary adhesive such as a sticky silicone strip to hold the paper in place where about half the sticky strip is on the paper and about half is on the letterpress magnetic top plate 1040, then removing the letterpress magnetic top plate 1050, applying ink to the design plate such as with an ink applicator or roller 1060, and aligning the letterpress magnetic top plate over and paper side down with the letterpress magnetic top plate magnets facing down toward the letterpress plate base and with the letterpress plate base registration spring pins 1070, then once aligned placing the letterpress magnetic top plate into place on the letterpress plate base registration spring pins such that the magnetic top plate is suspended above the design plate with the paper facing the design plate with alignment provided by the magnets 1075, pressing the letterpress magnetic top plate down onto the letterpress plate base to apply the ink to the paper such as by pressing the two plates together by hand or with use of a machine such as a slider machine 1080, and then removing the letterpress magnetic top plate from the letterpress plate base and removing the letterpressed paper from the letterpress magnetic top plate by removing any temporary adhesive securing the paper to the letterpress magnetic top plate 1090 as shown in FIG. 10, FIG. 13, FIG. 14.1 through FIG. 14.11, and FIG. 15 through FIG. 17C.

In places where the description above refers to particular implementations of systems and methods for a letterpress system, it should be readily apparent that a number of modifications may be made without departing from the spirit thereof and that these implementations may be applied to other to systems and methods for a letterpress system.

I claim:

1. A method of letterpress printing, comprising:

providing a letterpress plate system comprising a chase comprising a plurality of magnetic chase registration spring pins, a platen comprising a plurality of magnets, a design plate, an ink, and a paper;

placing a magnetic plate having at least one registration mark into a recess of the chase;

placing a die on top of a magnetic insert that is coupled to the chase;

placing a paper on a side of the platen with the at least one registration mark facing upward;

applying ink to the die;

placing the platen over the chase with the paper facing the die and with the plurality of magnets on the platen compatibly aligned with the magnetic chase registration spring pins;

closing the distance between the platen and the chase to apply the ink to the paper;

separating the platen from the chase; and removing the paper from the platen.

2. The method of letterpress printing of claim 1, further comprising using an ink applicator to apply the ink to the design.

3. The method of letterpress printing of claim 1, further comprising:

placing one or more shims into the recess area of the base of the chase; and securing the paper to the platen with a temporary adhesive.

4. The method of letterpress printing of claim 1, further comprising using a roller die-cutting machine to close the distance between the platen and the chase.

5. A method of letterpress printing, comprising:

providing a letterpress plate system comprising a base plate, a silicone sheet, a bottom plate, a top plate comprising a plurality of magnets, an ink, and a paper;

placing the silicone sheet on top of the base plate;

placing the bottom plate on top of the silicone sheet;

placing a die on top of the letterpress silicone sheet;

placing the top plate upside down with the plurality of magnets facing upward;

placing a paper on the top plate;

securing the paper to the top plate;

removing the top plate;

applying ink to the die;

aligning the top plate over and having the paper facing downward with the plurality of magnets of the top plate facing downward toward the base plate;

placing the top plate into place on a plurality of base plate registration spring pins to suspend the magnetic top plate above the die with the paper facing the die;

pressing the top plate down onto the letterpress plate base to apply the ink to the paper;

removing the top plate from the base plate; and removing the paper from the top plate.

6. A system for letterpress printing comprising;

a letterpress plate system, comprising:

a first letterpress plate; and a second letterpress plate, wherein the second letterpress plate is removably coupled to the first letterpress plate, wherein at least one of the first and second letterpress plates comprises a magnet;

a letterpress plate alignment feature, wherein the letterpress plate alignment feature is removably coupled to the letterpress plate, and wherein the letterpress plate alignment feature further comprises:

a first letterpress alignment feature removably coupled to the first letterpress plate; and a second letterpress alignment feature removably coupled to the second letterpress plate; and a registration mark, removably coupled to the letterpress plate and wherein the registration mark further comprises:

a first letterpress registration mark removably coupled to the first letterpress plate; and a second letterpress registration mark removably coupled to the second letter press plate.

7. The system of claim 6, wherein the magnet of the at least one of the first and second letterpress plates is removable.

8. The system of claim 6, wherein the first letterpress plate further comprises:

a first letterpress plate base;

a first letterpress plate recess; and a first letterpress plate insert removably coupled to the first letterpress plate base, and wherein the first letterpress plate insert comprises at least one of a magnetic first letterpress plate insert, a partially magnetic first letterpress plate insert, and a non-magnetic first letterpress plate insert; and wherein the second letterpress plate further comprises a second letterpress plate base.

9. The system of claim 6, wherein the letterpress plate further comprises:

a letterpress design plate;

a letterpress bottom plate;

a letterpress insert further comprising a silicone sheet;

a first letterpress plate base;

a second letterpress plate base further comprising a letterpress magnetic top plate;

and a letterpress plate alignment feature, wherein the letterpress plate alignment feature comprises at least one of an adhesive, a temporary adhesive, a silicone sticky strip, a removable tape, a compressible material, a registration spring, a connector, a magnet, a housing, a post, and a shim.

10. The system of claim 6, further comprising at least one of a handle, a recess, a finger recess, a spacer, and a shim.

11. The system of claim 6, further comprising at least one of an ink applicator, an adhesive, and a press.

12. The system of claim 6, wherein the letterpress plate alignment feature comprises at least one of a magnetic letterpress plate alignment feature, a post letterpress plate alignment feature, a registration spring pin letterpress plate alignment feature, and a letterpress plate alignment feature sized to be compatible with a letterpress plate alignment feature.

13. The system of claim 6, further comprising a letterpress design plate comprising at least one of a letterpress design plate, a die, a hand press, a stamp, a magnetic design plate, a non-magnetic design plate, a plastic design plate, a wood design plate, and a metal design plate, a coated design plate, and a raised design, wherein the raised design comprises at least one of a raised design plate, a raised design die, a raised design stamp, a raised design character, a raised design letter, a raised design symbol, and a raised design icon.

14. The system of claim 6, further comprising an ink.

15. The system of claim 14, further comprising a paper.

16. The system of claim 11, wherein the ink applicator comprises at least one of a pad, a roller, a brush, and a sponge.

17. The system of claim 11, wherein the adhesive comprises at least one of a temporary adhesive, a temporary tape, a partially removable adhesive, a partially removable tape, a removable adhesive, a removable tape, a painter's tape, a sticky strip, a silicone sticky strip, a permanent adhesive, and a permanent tape.

18. The system of claim 6, further comprising a press comprising a slider machine or a manual hand press.

19. The system of claim 6, wherein the registration mark at least partially comprises a grid.

20. The system of claim 6, wherein the letterpress plate further comprises:

a chase, the chase comprising:

a chase base comprising:

a chase spring pin;

a chase post;

a chase magnet;

a chase recess for a magnetic plate;

a chase handle;

a chase magnetic sheet; and a platen, wherein the platen is removably coupled to the chase and further comprises
a platen base comprising:
a platen alignment feature; and
a platen alignment grommet, and
wherein the registration mark further comprises:
a chase registration mark; and
a platen registration mark.

* * * * *